(12) United States Patent
Guo et al.

(10) Patent No.: US 12,533,372 B2
(45) Date of Patent: Jan. 27, 2026

(54) BIOLOGICAL POLYSACCHARIDE FOR PREVENTING AND TREATING ACNE AND STEROID-DEPENDENT DERMATITIS AND USE THEREOF

(71) Applicant: BOMAN (ZHEJIANG) BIOTECHNOLOGY CO., LTD., Hangzhou (CN)

(72) Inventors: Hongliang Guo, Zhejiang (CN); Xiuyuan Zhuang, Zhejiang (CN); Zhen Ye, Zhejiang (CN); Jiadi Wu, Zhejiang (CN); Qinjian Zhu, Zhejiang (CN); Xuan Wang, Zhejiang (CN)

(73) Assignee: BOMAN (ZHEJIANG) BIOTECHNOLOGY CO., LTD., Zhejiang (CN)

( * ) Notice: Subject to any disclaimer, the term of this patent is extended or adjusted under 35 U.S.C. 154(b) by 1235 days.

(21) Appl. No.: 17/057,749

(22) PCT Filed: May 21, 2019

(86) PCT No.: PCT/CN2019/087845
§ 371 (c)(1),
(2) Date: May 25, 2021

(87) PCT Pub. No.: WO2019/223699
PCT Pub. Date: Nov. 28, 2019

(65) Prior Publication Data
US 2022/0000902 A1    Jan. 6, 2022

(30) Foreign Application Priority Data
May 23, 2018  (CN) .......................... 201810503734.X

(51) Int. Cl.
| | | |
|---|---|---|
| A61K 31/716 | (2006.01) | |
| A61K 8/73 | (2006.01) | |
| A61K 45/06 | (2006.01) | |
| A61P 17/10 | (2006.01) | |
| A61Q 19/00 | (2006.01) | |

(52) U.S. Cl.
CPC .............. *A61K 31/716* (2013.01); *A61K 8/73* (2013.01); *A61K 45/06* (2013.01); *A61P 17/10* (2018.01); *A61Q 19/00* (2013.01)

(58) Field of Classification Search
CPC ........ A61K 31/07; A61K 31/716; A61K 8/73; A61K 45/06; A61P 17/00; A61P 17/10; A61Q 19/00; A61Q 19/08; C08B 37/0024
USPC ......................................................... 514/54
See application file for complete search history.

(56) References Cited

U.S. PATENT DOCUMENTS

2016/0015734 A1* 1/2016 Kristiansen .......... A61K 31/716
                                                                  424/537

FOREIGN PATENT DOCUMENTS

| CN | 102600494 A | 7/2012 | |
| KR | 20150088973 A * | 4/2015 | .............. A61P 17/18 |
| WO | WO 2012/022478 A2 * | 2/2021 | ............... A61K 8/73 |

OTHER PUBLICATIONS

Mossman, U.S. Pharmacist, 2006, 4, 34-42.*
Jensenak, M. et al., b-Glucan-based cream (containing pleuran isolated from pleurotus ostreatus) in supportive treatment of mild-to-moderate atopic dermatitis, Journal of Dermatological Treatment, vol. 27, No. 4, Dec. 9, 2015, ISSN: 0954-6634, pp. 351-354.

* cited by examiner

*Primary Examiner* — Ganapathy Krishnan
(74) *Attorney, Agent, or Firm* — NKL Law; Bin Lu

(57) ABSTRACT

Provided are a biological polysaccharide having the effect of preventing and treating acne and/or steroid-dependent dermatitis and the use thereof. Specifically, provided is the use of β-glucan for preparing a formulation or composition, wherein the formulation or composition is used in the prevention and/or treatment of acne and/or steroid-dependent dermatitis. The β-glucan has the effects of significantly relieving and improving acne and/or steroid-dependent dermatitis, effectively controlling the occurrence of acne and/or steroid-dependent dermatitis, accelerating the healing and/or regression of acne and/or steroid-dependent dermatitis.

7 Claims, 5 Drawing Sheets

Use 1 day

Use 4 days

Use 7 days

Use 33 days

BIOLOGICAL POLYSACCHARIDE FOR PREVENTING AND TREATING ACNE AND STEROID-DEPENDENT DERMATITIS AND USE THEREOF

TECHNICAL FIELD

The present invention relates to the field of biotechnology, in particular, to a biological polysaccharide for preventing and treating acne and steroid-dependent dermatitis and the use thereof.

BACKGROUND

Acne is a chronic inflammatory disease that involves follicle sebaceous glands, and often causes skin damage. The main causes of acne include endocrine disorders and abnormal keratinization of hair follicles, which in turn causes pore blockage and creates opportunities for infection of *Propionibacterium acnes*, causing skin inflammation. Currently, for the treatment of acne, it is generally to control sebum secretion, improve abnormal keratinization, antibacterial infection, and anti-inflammatory. Although common acne treated drugs such as antibiotics, vitamin A acids, benzoylperoxide, and plant bactericidal and bacteriostatic ingredients, can achieve effects such as inhibition of *Propionibacterium acnes*, there are problems such as drug resistance, irritating and dependence, which severely affected the therapeutic effect of acne. In addition, this kind of bactericidal products are easy to destroy the ecological balance of skin surface flora, thereby causing more serious skin problems. At present, the efficacy for acne treatment in the market is generally bactericide. These ingredients can only play a simple bactericidal role, but the anti-inflammatory effect is limited, and the repair of the skin is not effective.

Steroid-dependent dermatitis is due to long-term incorrect use of topical drugs or cosmetics containing glucocorticoids. In recent years, its incidence trend is rising obviously, and it is stubborn and difficult to cure. At present, the commonly used treatment methods stay in moisturizing, anti-inflammatory, anti-allergic and anti-infection treatment. The treatment cycle is long, the effect is poor.

Therefore, there is an urgent need to develop a drug that can effectively prevent and treat the above skin problems.

SUMMARY OF THE INVENTION

The purpose of the present invention is to provide a drug that can effectively treat acne and/or steroid-dependent dermatitis.

Another purpose of the present invention is to provide a biological polysaccharide with efficiency for preventing and treating acne and/or steroid-dependent dermatitis and application thereof.

In the first aspect of the present invention, there is provided a use of β-glucan for preparing a preparation or composition for the prevention and/or treatment of acne and/or steroid-dependent dermatitis.

In another preferred embodiment, the β-glucan is β-D-glucan.

In another preferred embodiment, the β-glucan is β-1,3-glucan, preferably β-1,3-glucan having β-1,6-branches.

In another preferred embodiment, the structure of the β-glucan is shown in formula I,

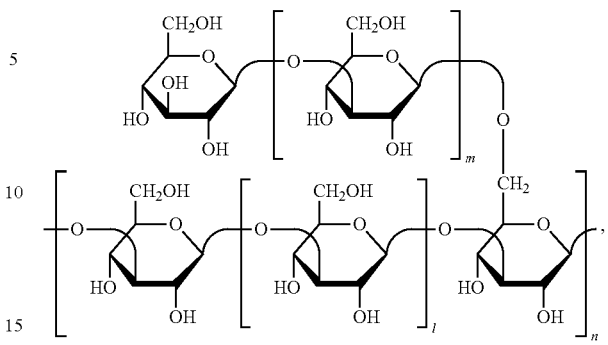

wherein, l is an integer of ≥0, preferably 0-50, preferably 0-10, more preferably 0-3, more preferably 1-2, more preferably 1; m is an integer of ≥0, preferably 0-19, preferably 0-4, more preferably 0-1, more preferably 0; n is an integer of ≥3, preferably 30-60000, more preferably 100-10000.

In another preferred embodiment, the branch degree (DB) of the β-glucan is 0.02-0.8, preferably 0.1-0.5, preferably 0.2-0.4.

In another preferred embodiment, the β-glucan comprises β-glucan having a triple helix stereo structure.

In another preferred embodiment, the content of the β-glucan having a triple helix stereo structure is 80%, 90%, 95%, based on the total molar amount of β-glucan.

In another preferred embodiment, the β-1, 3-backbone of the β-glucan is the main body of the triple helix stereo structure.

In another preferred embodiment, the β-1,6-branches of the β-glucan are located outside the triple helix stereo structure.

In another preferred embodiment, the molecular weight of the β-glucan is ≥2 kD, preferably 2 kD-40000 kD, more preferably 20 kD-20000 kD.

In another preferred embodiment, the molecular weight of β-glucan may be 5 kD-35000 kD; 10 kD-30000 kD; 50 kD-25000 kd; 100 kD-20000 kD; 200 kD-18000 kD; 400 kD-16000 kd; 500 kD-14000 kD; 1000 kD-12000 kD; 2000 kD-4000 kD; 3000 kD-5000 kD; 4000 kD-6000 kD; 5000 kD-7000 kD; 6000 kD-8000 kD; 7000 kD-9000 kD; or 8000 kD-10000 kD.

In another preferred embodiment, the β-glucan is selected from the group consisting of *Schizophyllum* β-glucan, *Lentinus edodes* β-glucan, *Sclerotium* β-glucan, *Grifola frondosa* β-glucan, *Pleurotus ostreatus* polysaccharide, mushroom β-glucan, yeast β-glucan, oat β-glucan, and a combination thereof.

In another preferred embodiment, the β-glucan is *Schizophyllum* β-glucan.

In another preferred embodiment, the *Lentinus edodes* β-glucan is the β-glucan of every five β-1, 3-backbones with two β-1, 6-branches, and each branch with one glucose residue.

In another preferred embodiment, the purity of the β-glucan is ≥70%, preferably ≥90%, more preferably ≥95%, more preferably ≥99%.

In another preferred embodiment, the β-glucan has good stability.

In another preferred embodiment, the β-glucan is in solid state or liquid state, such as β-glucan solid particle or powder, or β-glucan aqueous solution.

In another preferred embodiment, the size of β-glucan particle or powder is ≤20 mm, preferably 0.001-10 mm, more preferably 0.01-5 mm, more preferably 0.1-2 mm.

In another preferred embodiment, the β-glucan is completely water soluble β-glucan.

In another preferred embodiment, the β-glucan (particle or powder) has good water solubility and/or natural solubility.

In another preferred embodiment, the solubility of the β-glucan (particle or powder) in water (100 g) at 25° C. is ≥0.0001 g, preferably 0.01-50 g, more preferably 0.1-10 g.

In another preferred embodiment, the solubility of the β-glucan (particle or powder) in water (100 g) at 25° C. may be 0.1-100 g; 0.2-90 g; 0.5-80 g; 1-50 g; or the solubility may be 0.1-0.3 g; 0.2-0.4 g; 0.3-0.5 g; 0.4-0.6 g; 0.5-0.7 g; 0.6-0.8 g; 0.7-0.9 g; 0.8-1 g; or 1-3 g; 2-4 g; 3-5 g; 4-6 g; 5-7 g; 6-8 g; 7-9 g; 8-10 g.

In another preferred embodiment, the β-glucan solution is a solution of β-glucan in water, i.e., a β-glucan aqueous solution.

In another preferred embodiment, the β-glucan (water) solution has a high viscosity; preferably the viscosity of β-glucan aqueous solution (25° C.) having a mass concentration of 0.5% is ≥40 mPa·s, more preferably 100-10000 mPa·s, more preferably 500-2000 mPa·s.

In another preferred embodiment, the viscosity of β-glucan aqueous solution (25° C.) having a mass concentration of 0.5% may be 50-10000 mPa·s; 100-9000 mPa·s; 200-8000 mPa·s; 300-7000 mPa·s; 400-6000 mPa·s; 450-5000 mPa·s; 500-5000 mPa·s; 550-4000 mPa·s; 600-3000 mPa·s; 650-2000 mPa·s; 700-1500 mPa·s.

In another preferred embodiment, the β-glucan aqueous solution having a mass concentration of 1% has a high clarity or high light transmittance, the light transmittance of the β-glucan aqueous solution having a mass concentration of 1% is ≥50%, preferably ≥80%, preferably ≥85%, more preferably ≥95%;

In another preferred embodiment, the β-glucan solution has good stability.

In another preferred embodiment, the prevention and/or treatment of acne includes: preventing the occurrence of acne, improving or relieving acne symptoms, accelerating the regression or healing of acne, improving acne scars (acne marks), or accelerating the regression of acne scars (acne marks).

In another preferred embodiment, the "acne" means a chronic inflammatory skin disease in the hair follicle sebaceous gland, which mainly occurs in adolescents. The clinical manifestations are characterized by pimples in face, papule, pustule, nodules, and other pleomorphic lesions, also known as zits.

In another preferred embodiment, the acne includes severe acne and mild acne.

In another preferred embodiment, the acne is selected from the group consisting of white head acne, black head acne, papular acne, pustular acne, cystic acne, nodular acne, and a combination thereof.

In another preferred embodiment, the prevention and/or treatment of steroid-dependent dermatitis includes: preventing steroid-dependent dermatitis, improving or relieving steroid-dependent dermatitis symptoms, accelerating the regression or healing of steroid-dependent dermatitis, improving residual scars of steroid-dependent dermatitis, or accelerating the regression of steroid-dependent dermatitis scars.

In another preferred embodiment, the "steroid-dependent dermatitis" refers to dermatitis caused by long-term repeated inappropriate external use of hormones (steroids). The clinical manifestations include: epidermal and dermal thinning, hypopigmentation, vascular exposure, rosacea-like dermatitis, acne-like dermatitis, folliculitis, which is characterized by steroid-dependent and rebound phenomenon, also known as hormone face.

In another preferred embodiment, the steroid-dependent dermatitis symptoms are selected from the group consisting of skin itching, burning, pain, dryness, desquamation, tension, facial skin flushing, recurrent erythema, papules, skin atrophy and thinning, telangiectasia, generalized acne, rosacea-like changes, pigmentation or depigmentation, facial skin atrophic lines, hair follicle inflammatory abscess, etc.

In another preferred embodiment, the preparation or composition contains (a) β-glucan; and optionally (b) pharmaceutically, cosmetic, or device acceptable carriers or excipients.

In another preferred embodiment, the preparation or composition contains (a) *Schizophyllum* β-glucan; and optionally (b) pharmaceutically, cosmetic, or device acceptable carriers or excipients.

In another preferred embodiment, the preparation or composition contains 0.0001-99 wt %, preferably 0.001-90 wt %, more preferably 0.01-50 wt %, more preferably 0.05-10 wt % of β-glucan, according to the total weight of the preparation or composition.

In another preferred embodiment, the mass concentration of the β-glucan in the preparation or composition is ≥1 μg/ml, specifically may be 1 μg/mL-200 mg/ml, or 1 g/mL-5 mg/ml, or 1 μg/mL-1 mg/ml.

In another preferred embodiment, the preparation or composition is also used to enhance skin immunity or active defense function.

In another preferred embodiment, the preparation or composition is also used for the prevention and/or treatment of skin mucosa inflammation or other skin inflammatory diseases.

In another preferred embodiment, the preparation or composition is also used for the prevention and/or treatment of skin problems selected from the group consisting of dryness, ruddiness, allergy, inflammation, fine lines, color spots, greasiness, and a combination thereof.

In another preferred embodiment, the dosage form of the composition or preparation is a solid dosage form, a semi-solid dosage form, or a liquid dosage form, such as solution, gel, cream, emulsion, and the like.

In another preferred embodiment, the composition is a pharmaceutical composition or a cosmetic composition, preferably an external drug dosage form.

In another preferred embodiment, the preparation is an external preparation or transdermal preparation (such as an external solution, ointment, a patch, etc.).

In another preferred embodiment, the preparation or composition comprises cosmetics, food, medical devices or medicines, and specific cosmetics may be functional cosmetics.

In the second aspect of the invention, there is provided a preparation comprising β-glucan.

In another preferred embodiment, the β-glucan is selected from the group consisting of *Schizophyllum* β-glucan, *Lentinus edodes* β-glucan, *Sclerotium* β-glucan, *Grifola frondosa* β-glucan, *Pleurotus ostreatus* polysaccharide, mushroom β-glucan, yeast β-glucan, oat β-glucan, and a combination thereof.

In another preferred embodiment, the β-glucan is *Schizophyllum* β-glucan.

In another preferred embodiment, the β-glucan is completely water soluble β-glucan.

In another preferred embodiment, the preparation is *Schizophyllum* β-glucan, and the β-glucan has good water solubility, natural solubility and/or redissolve ability.

In another preferred embodiment, the β-glucan in the preparation is in solid form or liquid form.

In another preferred embodiment, the preparation comprises β-glucan aqueous solution, the mass concentration of the β-glucan is 0.0001-50 wt %, preferably 0.02-10 wt %, more preferably 0.05-5 wt %, according to the total weight of the β-glucan aqueous solution.

In another preferred embodiment, the content of β-glucan aqueous solution in the preparation is ≥80 wt %, preferably ≥90 wt %, more preferably ≥95 wt %, more preferably ≥99 wt %, more preferably ≥99.5 wt %, according to the total weight of the preparation.

In another preferred embodiment, the β-glucan in the preparation has one or more characteristics selected from the group consisting of:
(1) the purity of the β-glucan is ≥70%, preferably ≥90%, more preferably ≥95%, more preferably ≥99%;
(2) the β-glucan has good water solubility, redissolve ability, and/or natural solubility;
(3) the solubility of the β-glucan (solid particle or powder) in water at 25° C. is ≥0.0001 g of 100 g water, preferably 0.01-50 g of 100 g water, more preferably 0.1 g-10 g of 100 g water;
(4) the β-glucan aqueous solution has a high clarity or high light transmittance, preferably, the light transmittance of the β-glucan aqueous solution having a mass concentration of 1% is ≥50%, preferably ≥80%, preferably ≥85%, more preferably ≥95%;
(5) the β-glucan solution has a high viscosity; preferably, the viscosity of β-glucan aqueous solution (25° C.) having a mass concentration of 0.5% is ≥40 mPa·s, more preferably 100-10000 mPa·s, more preferably 600-2000 mPa·s;
(6) the β-glucan aqueous solution has good stability; and/or
(7) the molecular weight of the β-glucan is ≥2 kD, preferably 2 kD-40000 kD, more preferably 20 kD-20000 kD.

In another preferred embodiment, the preparation contains (a) β-glucan; and (b) pharmaceutically, cosmetic, or device acceptable carriers or excipients.

In another preferred embodiment, the preparation contains 0.0001-99 wt %, preferably 0.001-90 wt %, more preferably 0.01-50 wt %, more preferably 0.05-10 wt % of β-glucan, according to the total weight of the preparation.

In another preferred embodiment, the preparation further contains (c) a second active ingredient, the second active ingredient is an active ingredient different from the β-glucan for treating acne and/or steroid-dependent dermatitis, or an active ingredient for treating skin and mucosa inflammation or other skin diseases.

In another preferred embodiment, the active ingredient for treating acne is selected from the group consisting of antibiotic agents, antibacterial agents, vitamin A acids, α-hydroxy acids, plant bactericidal and bacteriostatic components, glucocorticoid, estrogen, progesterone, and a combination thereof; specifically, for example, erythromycin, benzoyl peroxide, isotretinoin, Adapalene, azelaic acid, nicotinamide, sulfur, Resorcinol, salicylic acid, and a combination thereof.

In another preferred embodiment, the active ingredient for treating steroid-dependent dermatitis is selected from the group consisting of humectant, skin barrier repair ingredient, external non-hormone immunosuppressants, antihistamine drug, anti-allergic drug, antibacterial agent and antibiotics, etc., specifically, for example, glycerin, allantoin, hyaluronic acid, polyglutamic acid, aloe vera gel, silicone oil, horse oil, sheep oil, ceramide, epidermal growth factor, Tacrolimus, Pimecrolimus, Loratadine, Ebastine, boric acid, benzalkonium chloride, erythromycin, etc., and a combination thereof.

In another preferred embodiment, the active ingredient for treating acne and/or steroid-dependent dermatitis is selected from the following group of traditional Chinese medicines and extracts thereof: heat clearing and exterior resolving agents, heat clearing and dampness clearing and detoxification agents, heat clearing and blood cooling and detoxification agents, agents promoting blood circulation and removing stasis, agents harmonizing Chong Ren, agents dispelling wind and eliminating dampness, and a combination thereof; specifically, for example, Macrocephalae Rhizoma, Pinelliae Rhizoma, Radix Bupleuri, Pericarpium Citri Reticulatae, Paeoniae Radix Rubra, Rhei Radix Et Rhizoma, Rehmanniae Radix, Poria, Radix Rhizoma Glycyrrhizae, Ramulus Cinnamomi, Coptidis Rhizoma, Scutellariae Radix, Centellae Herba, Curcumae Longae Rhizoma, Lonicerae Japonicae Flos, Forsythiae Fructus, Root/Cortex Moutan, Fructus Arctii, Folium Eriobotryae, herba taraxaci, Ginseng Radix Et Rhizoma, cortex mori, rhizoma dioscoreae, born hawthorn, fructus mume, Chrysanthemi Indici Flos, born Coicis Semen, Fructus Gardeniae Preparatus, Fructus Aurantii Immaturus, Caulis Bambusae in Taenia, Rhizoma et Radix Notopterygii, Radix Angelicae Pubescentis, Radix Saposhnikoviae, Radix Gentianae Macrophyllae, Clematidis Radix Et Rhizoma, Cortex Acanthopanacis, and a combination thereof.

In another preferred embodiment, the active ingredient for treating skin mucosa inflammation or other skin disease is selected from the group consisting of antihistamines, antibiotics, antifungal agents, hormones, immunosuppressants, vitamins, vitamin A acids, detergents, protectants, antipruritic agents, keratin promoters, exfoliators, astringents, corrosives, antibacterial agents, antifungal agents, antiviral agents, insecticidal agents, sunscreen agents, decolorizers, and a combination thereof; specifically, for example, Chlorphenamine, Loratadine, Astemizole, Ranitidine, dexamethasone, methylprednisolone, nystatin, ketoconazole, clotrimazole, 5-fluorocytosine, Adapalene, tripterygium glycosides, chloroquine, iodine, calamine lotion, and a combination thereof.

In another preferred embodiment, the preparation is used for prevention and/or treatment of acne and/or steroid-dependent dermatitis.

In the third aspect of the invention, there is provided a composition product comprising:
(1) a first pharmaceutical composition containing (a) a first active ingredient of β-glucan; and (b) a pharmaceutically, cosmetics, or device acceptable carrier or excipient;
(2) a second pharmaceutical composition, which is a drug for the treatment of acne, a drug for the treatment of steroid-dependent dermatitis, or a drug for the treatment of skin mucosal inflammation or other skin diseases.

In another preferred embodiment, the first pharmaceutical composition contains 0.0001-99 wt %, preferably 0.001-90 wt %, more preferably 0.01-50 wt %, more preferably 0.05-10 wt % of β-glucan, according to the total weight of the first pharmaceutical composition.

In another preferred embodiment, the β-glucan is selected from the group consisting of *Schizophyllum* β-glucan, *Lentinus edodes* β-glucan, *Sclerotium* β-glucan, *Grifola frondosa* β-glucan, *Pleurotus ostreatus* polysaccharide, mushroom β-glucan, yeast β-glucan, oat β-glucan, and a combination thereof.

In another preferred embodiment, the β-glucan is *Schizophyllum* β-glucan.

In another preferred embodiment, the acne treatment drug contains (a) a second active ingredient, which is an acne treatment active ingredient different from the β-glucan; and (b) a pharmaceutically, cosmetics, or device acceptable carrier or excipient.

In another preferred embodiment, the steroid-dependent dermatitis treatment drug contains (a) a second active ingredient, which is a steroid-dependent dermatitis treatment active ingredient different from the β-glucan; and (b) a pharmaceutically, cosmetics, or device acceptable carrier or excipient.

In another preferred embodiment, the acne treatment drug is selected from the group consisting of antibiotic agents, antibacterial agents, vitamin A acids, α-hydroxy acids, plant bactericidal and bacteriostatic components, glucocorticoid, estrogen, progesterone, and a combination thereof; specifically, for example, erythromycin, benzoyl peroxide, isotretinoin, Adapalene, azelaic acid, nicotinamide, sulfur, Resorcinol, salicylic acid, and a combination thereof.

In another preferred embodiment, the active ingredient for treating steroid-dependent dermatitis is selected from the group consisting of humectant, skin barrier repair ingredient, external non-hormone immunosuppressants, antihistamine drug, anti-allergic drug, antibacterial agent and antibiotics, etc., specifically, for example, glycerin, allantoin, hyaluronic acid, polyglutamic acid, aloe vera gel, silicone oil, horse oil, sheep oil, ceramide, epidermal growth factor, Tacrolimus, Pimecrolimus, Loratadine, Ebastine, boric acid, benzalkonium chloride, erythromycin, etc, and a combination thereof.

In another preferred embodiment, the acne and/or steroid-dependent dermatitis treatment drug is selected from the following group of traditional Chinese medicines and extracts thereof: heat clearing and exterior resolving agents, heat clearing and dampness clearing and detoxification agents, heat clearing and blood cooling and detoxification agents, agents promoting blood circulation and removing stasis, agents harmonizing Chong Ren, agents dispelling wind and eliminating dampness, and a combination thereof; specifically, for example, Macrocephalae Rhizoma, Pinelliae Rhizoma, Radix Bupleuri, Pericarpium Citri Reticulatae, Paeoniae Radix Rubra, Rhei Radix Et Rhizoma, Rehmanniae Radix, Poria, Radix Rhizoma Glycyrrhizae, Ramulus Cinnamomi, Coptidis Rhizoma, Scutellariae Radix, Centellae Herba, Curcumae Longae Rhizoma, Lonicerae Japonicae Flos, Forsythiae Fructus, Root/Cortex Moutan, Fructus Arctii, Folium Eriobotryae, herba taraxaci, Ginseng Radix Et Rhizoma, cortex mori, rhizoma dioscoreae, born hawthorn, fructus mume, Chrysanthemi Indici Flos, born Coicis Semen, Fructus Gardeniae Preparatus, Fructus Aurantii Immaturus, Caulis Bambusae in Taenia, Rhizoma et Radix Notopterygii, Radix Angelicae Pubescentis, Radix Saposhnikoviae, Radix Gentianae Macrophyllae, Clematidis Radix Et Rhizoma, Cortex Acanthopanacis, and a combination thereof.

In another preferred embodiment, the treatment drug of skin mucosa inflammation or other skin disease is selected from the group consisting of antihistamines, antibiotics, antifungal agents, hormones, immunosuppressants, vitamins, vitamin A acids, detergents, protectants, antipruritic agents, keratin promoters, exfoliators, astringents, corrosives, antibacterial agents, antifungal agents, antiviral agents, insecticidal agents, sunscreen agents, decolorizers, and a combination thereof; specifically, for example, Chlorphenamine, Loratadine, Astemizole, Ranitidine, dexamethasone, methylprednisolone, nystatin, ketoconazole, clotrimazole, 5-fluorocytosine, Adapalene, tripterygium glycosides, chloroquine, iodine, calamine lotion, and a combination thereof.

In another preferred embodiment, the first pharmaceutical composition and the second pharmaceutical composition are each independent, or combined into one.

In another preferred embodiment, the composition is used for treatment and/or prevention of acne and/or steroid-dependent dermatitis.

In another preferred embodiment, the composition product is a cosmetic or drug.

In the fourth aspect of the invention, there is provided a method of preventing and/or treating acne and/or steroid-dependent dermatitis, comprising the step of: (a) administering β-glucan to subject in need.

In another preferred embodiment, the β-glucan is selected from the group consisting of *Schizophyllum* β-glucan, *Lentinus edodes* β-glucan, *Sclerotium* β-glucan, *Grifola frondosa* β-glucan, *Pleurotus ostreatus* polysaccharide, mushroom β-glucan, yeast β-glucan, oat β-glucan, and a combination thereof.

In another preferred embodiment, the β-glucan is *Schizophyllum* β-glucan.

In another preferred embodiment, the subject include acne patients, steroid-dependent dermatitis patients, or normal populations.

It should be understood that within the scope of the present invention, each technical features of the present invention described above and in the following (as examples) may be combined with each other to form a new or preferred technical solution, which is not listed here due to space limitations.

DESCRIPTION OF FIGURE

FIGS. 3A and 3B are the photos of a severe acne patient before and after the trial of administrating *Schizophyllum* β-glucan product for 1 month in Example 2, respectively. FIGS. 3C and 3D are the photos of another patient with mild acne and redness before and after the trial of administrating *Schizophyllum* β-glucan product for 1 month in Example 2, respectively.

DETAILED DESCRIPTION

Figure 1:
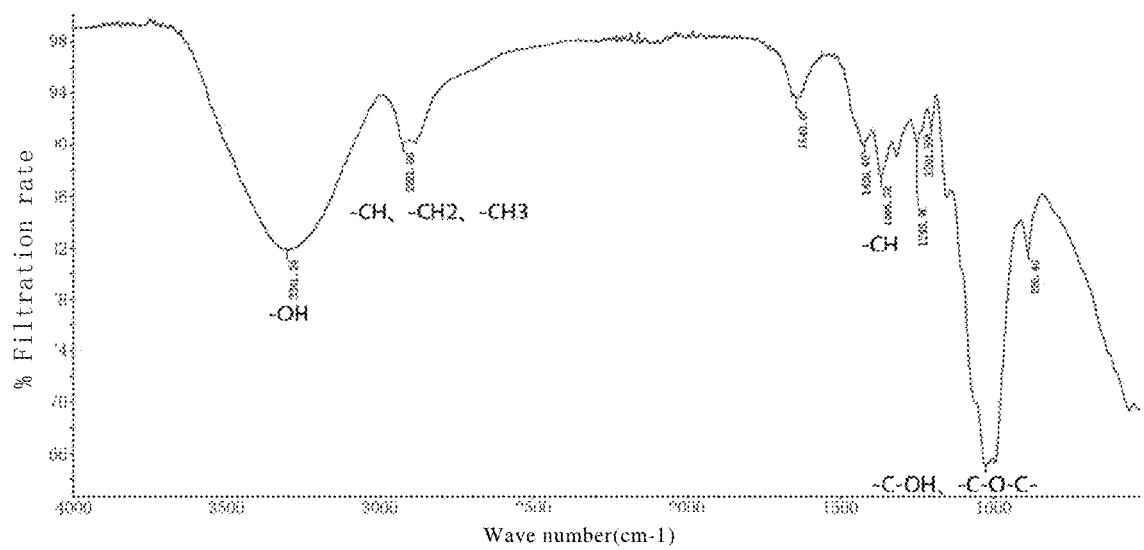
FIG. 1 shows the Fourier transform infrared spectrum of the *Schizophyllum* β-glucan prepared in Example 1.

After extensive and in-depth research, the present inventors unexpectedly discovered for the first time that β-glucan, especially β-glucan (such as *Schizophyllum* β-glucan) with naturally solubility, high molecular weight, high viscosity could prevent and/or treat acne, steroid-dependent dermatitis effectively. Experiments have shown that *Schizophyllum* β-glucan has obvious effect on relieving and improving acne and/or steroid-dependent dermatitis, controlling the occurrence of acne and/or steroid-dependent dermatitis effectively, accelerating the healing or regression of acne and/or steroid-dependent dermatitis. At the same time, *Schizophyllum* β-glucan can also enhance skin active defense function, activate skin natural immunity, antibacterial, anti-inflammatory and repair skin, treat or prevent skin mucosa or other skin inflammatory diseases, improve patient skin dry or skin ruddiness, and relieve the patient's skin allergies, fine lines, color spots or greasiness. On this basis, the present invention has been completed.

Terms

Unless otherwise defined, all technical and scientific terms used herein have the same meanings as those commonly understood by those skilled in the art to which the present invention belongs.

As used herein, when used in reference to specific enumerated values, the term "approximately" means that the value may vary by no more than 1% from the enumerated value. For example, as used herein, "about 100" includes all values between 99 and 101 (e.g., 99.1, 99.2, 99.3, 99.4, etc.).

As used herein, the term "contains" or "includes (comprises)" can be open, semi-closed and closed. In other words, the term also includes "substantially consisting of . . . " or "consisting of . . . ".

As used herein, the term "completely water soluble" refers to the β-glucan in the solid form can be completely dissolved in water into a β-glucan aqueous solution, i.e., the solubility of β-glucan in water of 100 g at 25° C. is ≥0.0001 g, preferably 0.01-50 g, more preferably 0.1 g-10 g.

As used herein, the term "natural solubility" refers to the property of the natural state β-glucan itself to dissolve completely in water to form an aqueous solution. The "natural state β-glucan" means that β-glucan is produced by a natural method (such as biological fermentation), and the β-glucan has not been chemically modified, and has not undergone any physical and/or chemical and/or biological methods to break its long-chain molecules to reduce its molecular mass. In another preferred embodiment, the β-glucan of the present invention is a natural state of β-glucan.

As used herein, types of acne include: papular acne, pustular acne, nodular acne, cystic acne. Specifically, Papular acne: inflammatory or non-inflammatory small particles of acne, with a diameter ≤5 mm, and may appear in scattered or dense sheets.

Pustular acne: an acne mainly of small pustules, and accompanied by inflammatory papules, with a diameter ≤5 mm, wherein the pustules contains a large amount of viscous pus.

Nodular acne: on the basis of pustular acne, a large number of keratinocytes, sebum and pus cells accumulate in the sebum of hair follicles, which destroy the sebum structure of hair follicles and form red or light colored nodules above the surface of skin or under the skin. The invasion site is deep, the touch is hard, and some of them feel painful under pressure.

Cystic acne: an acne mainly of cystic mass of different sizes, with no tip, severe inflammation, containing a large amount of tissue liquid, and strong pressure pain, often burst and overflow pus. It is often accompanied by papules, nodules, pustules, abscesses, etc.

Steroid-Dependent Dermatitis

The "steroid-dependent dermatitis" refers to dermatitis caused by long-term repeated inappropriate external use of hormones, clinical manifestations are characterized by epidermal and dermal thinning, hypopigmentation, pigmentation, vascular exposure, rosacea-like dermatitis, acne-like dermatitis, folliculitis, which is characterized by steroid-dependent and rebound phenomenon, also known as hormone face. Specifically, Epidermal and dermal thinning: long-term external local use of hormone can result in reduced formation of cuticle granules and cuticle thinning. The elastic changes of the dermal glycoprotein and proteoglycans reduce the adhesion between the fibril of the collagen, and the collagen synthesis is reduced and thinned.

Hypopigmentation, pigmentation: due to the reduction in the layers of the cuticle, melanin migration to keratinocytes decreases, causing hypopigmentation. The pigmentation may be associated with glucocorticoid activation of melanocyte to regenerate pigment.

Vascular exposure: the decrease of the adhesion between the collagen fibers in the vascular wall can lead to the widening of the vessels, and the disappearance of the dermal collagen leads to the exposure of the surface vessels.

Rosacea-like, acne-like dermatitis: in hormone-induced rosacea-like lesions, the density of *Demodex folliculorum* increased significantly, and the *Demodex mit* closes the hair follicle sebaceous gland outlet, causing inflammatory response or allergic reaction. Strong hormones can also make the sebaceous gland hyperplasia, and lead to the peculiar rosacea like rash. Hormones can degenerate hair follicle epithelium, resulting in the blocking of outlet, the occurrence of acne-like rash or the aggravation of the primary acne.

Folliculitis: due to the immunosuppressive effect of hormones, the local hair follicle may be infected and primary folliculitis are aggravated.

Steroid-dependent and rebound phenomenon: the anti-inflammatory properties of hormone can inhibit the development of papules and reduce itching, resulting in vasoconstriction and erythema disappear. However, hormone can not eliminate the cause of the disease. After deactivating, it can often cause aggravation of the primary disease, which can be manifested as rebound phenomenons, such as inflammatory edema, redness, burning sensation, discomfort and acute pustular rash and the like. The phenomenons often occur 2 to 10 days after deactivating hormones and last for a few days or about 3 weeks. The patients continue to use hormone because of the rebound phenomenons, which leads to steroid-dependent.

General diagnostic methods for steroid-dependent dermatitis include:
1. Long-term repeated external use of glucocorticoid for more than 1 month, the condition improved during the administration, and the phenomenon occurs again after drug withdrawal.
2. Primary skin disease has been cured, and there are repeated obvious erythema, papules, pustules, skin striations disappearance, desquamation and other dermatitis performance.
3. It usually occurs in thin and tender skin areas such as the face, vulva, and folds.
4. After long-term medication, symptoms such as hyperpigmentation (hypopigmentation), atrophic lines, telangiectasia, hirsutism, and pustules are left, accompanied by tingling and burning sensation.

β-glucan

β-glucan is a kind of natural polysaccharide. Many kinds of β-glucan can be found in the natural environment. It is usually present in the cell wall of special types of bacteria, yeast, fungi (*Ganoderma lucidum*), and also in the seed coating of higher plants. There are two main methods for the production of β-glucan, one of which is to extract from cereal such as oats or the solid fungi such as mushrooms directly; the second of which is through the liquid fermentation of fungi or bacteria, and through the extraction and processing of the fermentation liquid, to obtain β-glucan.

As used herein, "the present invention β-glucan", "the biological polysaccharide of the present invention" can be used interchangeably, mainly refers to β-glucan as described in the first aspect of the invention, the β-glucan is selected from the group consisting of *Schizophyllum* β-glucan, *Lentinus edodes* β-glucan, *Sclerotium* β-glucan, *Grifola frondosa* β-glucan, *Pleurotus ostreatus* polysaccharide, mushroom β-glucan, yeast β-glucan, oat β-glucan, and a combination thereof; preferably *Schizophyllum* β-glucan.

As used herein, "*Schizophyllum* β-glucan" refers to β-glucan derived from the *Schizophyllum*.

In another preferred embodiment, the structure of the β-glucan is shown in formula I.

In another preferred embodiment, the molecular weight of β-glucan is ≥2 kD, preferably 2 kD-40000 kD, more preferably 20 kD-20000 kD.

In another preferred embodiment, the molecular weight of β-glucan may be 5 kD-35000 kD; 10 kD-30000 kD; 50 kD-25000 kd; 100 kD-20000 kD; 200 kD-18000 kD; 400 kD-16000 kd; 500 kD-14000 kD; 1000 kD-12000 kD; 2000 kD-4000 kD; 3000 kD-5000 kD; 4000 kD-6000 kD; 5000 kD-7000 kD; 6000 kD-8000 kD; 7000 kD-9000 kD; or 8000 kD-10000 kD.

In another preferred embodiment, the purity of the β-glucan is ≥70%, preferably ≥90%, more preferably ≥95%, more preferably ≥99%.

In another preferred embodiment, the β-glucan has good stability.

In another preferred embodiment, the β-glucan is in solid state or liquid state, such as β-glucan solid particle or powder, or β-glucan aqueous solution.

In another preferred embodiment, the size of β-glucan particle or powder is ≤20 mm, preferably 0.001-10 mm, more preferably 0.1-5 mm, more preferably 0.1-2 mm.

In another preferred embodiment, the β-glucan (particle or powder) has good water solubility and/or natural solubility.

In another preferred embodiment, the solubility of the β-glucan (particle or powder) in water (100 g) at 25° C. is ≥0.0001 g, preferably 0.01-50 g, more preferably 0.1-10 g.

In another preferred embodiment, the solubility of the β-glucan (particle or powder) in water (100 g) at 25° C. may be 0.1-100 g; 0.2-90 g; 0.5-80 g; 1-50 g; or the solubility may be 0.1-0.3 g; 0.2-0.4 g; 0.3-0.5 g; 0.4-0.6 g; 0.5-0.7 g; 0.6-0.8 g; 0.7-0.9 g; 0.8-1 g; or 1-3 g; 2-4 g; 3-5 g; 4-6 g; 5-7 g; 6-8 g; 7-9 g; 8-10 g.

In another preferred embodiment, the β-glucan solution is a solution of β-glucan in water, i.e., a β-glucan aqueous solution.

In another preferred embodiment, the β-glucan (water) solution has a high viscosity; preferably the viscosity of β-glucan aqueous solution (25° C.) having a mass concentration of 0.5% is ≥40 mPa·s, more preferably 100-10000 mPa·s, more preferably 500-2000 mPA·S.

In another preferred embodiment, the viscosity of β-glucan aqueous solution (25° C.) having a mass concentration of 0.5% may be 50-10000 mPa·s; 100-9000 mPa·s; 200-8000 mPa·s; 300-7000 mPa·s; 400-6000 mPa·s; 450-5000 mPa·s; 500-5000 mPa·s; 550-4000 mPa·s; 600-3000 mPa·s; 650-2000 mPa·s; 700-1500 mPa·s.

In another preferred embodiment, the β-glucan aqueous solution having a mass concentration of 1% has a high clarity or high light transmittance, the light transmittance of the β-glucan aqueous solution having a mass concentration of 1% is ≥50%, preferably ≥80%, preferably ≥85%, more preferably ≥95%;

In another preferred embodiment, the β-glucan solution has good stability.

In another preferred embodiment, the β-glucan is derived from higher plants or various bacteria and fungi.

The example of the present invention specifically takes the fermentation product of *Schizophyllum* as an example, but is not limited thereto.

The β-glucan of the present invention is an effective component for preventing and treating acne and/or steroid-dependent dermatitis. On the one hand, the β-glucan enhances the resistance of normal skin, thereby effectively preventing the infection of external pathogenic microorganisms; on the other hand, for skin inflammation caused by bacterial infections, β-glucan can prevent excessive inflammation from causing damage, and at the same time promote the repair of damaged skin. The β-glucan of the present invention also enhances skin active defense function, excites cellular basic immune function, and prevents excessive inflammation. It has two-way immune regulation function, and will not damage the skin of patients or make them resistant.

Preparation or Composition

The present invention provides a preparation or composition for prevention and/or treatment of acne and/or steroid-dependent dermatitis, which contains (a) β-glucan; and optionally (b) pharmaceutically, cosmetic, or device acceptable carriers or excipients.

In another preferred embodiment, the preparation or composition contains (a) *Schizophyllum* β-glucan; and optionally (b) pharmaceutically, cosmetic, or device acceptable carriers or excipients.

In another preferred embodiment, the preparation or composition contains 0.0001-99 wt %, preferably 0.001-90 wt %, more preferably 0.01-50 wt %, more preferably 0.05-10 wt % of β-glucan (preferably *Schizophyllum* β-glucan), according to the total weight of the preparation or composition.

In another preferred embodiment, the mass concentration of the β-glucan in the preparation or composition is ≥1 µg/mL, specifically may be 1 µg/mL-200 mg/ml, or 1 g/mL-5 mg/mL, or 1 µg/mL-1 mg/mL.

In another preferred embodiment, the preparation comprises *Schizophyllum* β-glucan aqueous solution, the content of *Schizophyllum* β-glucan in the preparation is ≥80 wt %, preferably ≥90 wt %, more preferably ≥95 wt %, more preferably ≥99 wt %, more preferably ≥99.5 wt %, according to the total weight of the preparation.

In another preferred embodiment, in the preparation, the mass concentration of the *Schizophyllum* β-glucan in the *Schizophyllum* β-glucan aqueous solution is 0.0001-50 wt %, preferably 0.02-10 wt %, more preferably 0.05-5 wt %, according to the total weight of the *Schizophyllum* β-glucan aqueous solution.

In a preferred embodiment, the present invention provides a preparation for prevention and/or treatment of acne and/or steroid-dependent dermatitis, which comprises: β-glucan, 1,3-butanediol, 1,3-propanediol, polyethylene glycol 400, glycerol, hyaluronic acid, and deionized water.

In another preferred embodiment, the components of the preparation are shown in Table 1:

TABLE 1

Preparation with efficacy of prevention and/or treatment of acne and/or steroid-dependent dermatitis

| Ingredient | Addition amount (% or weight parts) | | |
|---|---|---|---|
| | Preparation 1 | Preparation 2 | Preparation 3 |
| β-glucan of the present invention | 0.001-20 | 0.01-2 | 0.05-1 |
| 1,3-butanediol | 0.1-5 | 0.1-5 | 0.1-5 |
| 1,3-propanediol | 0.1-5 | 0.1-5 | 0.1-5 |
| Polyethylene glycol 400 | 0.1-5 | 0.1-5 | 0.1-5 |
| Glycerin | 0.1-5 | 0.1-5 | 0.1-5 |
| Hyaluronic acid | 0.01-1 | 0.01-1 | 0.01-1 |
| Deionized water | 59-99.589 | 77-99.58 | 78-99.54 |

The "active ingredient (first active ingredient)" in the preparation or composition of the present invention refers to β-glucan (preferably *Schizophyllum* β-glucan) of the present invention.

The "active ingredient (first active ingredient)", the preparation and/or compositions of the present invention can be used to prevent and/or treat acne and/or steroid-dependent dermatitis.

In another preferred embodiment, the "active ingredient (first active ingredient)", the preparation and/or composition can also be used to prevent and/or treat skin mucosa inflammation or other skin inflammatory diseases.

In another preferred embodiment, the "active ingredient (first active ingredient)", the preparation and/or composition can also be used for the prevention and/or treatment of skin problems selected from the group consisting of dryness, ruddiness, allergy, inflammation, fine lines, color spots, greasiness, and a combination thereof.

The "second active ingredient" refers to the active ingredient different from the β-glucan for treating acne and/or steroid-dependent dermatitis, or an active ingredient for treating skin and mucosa inflammation or other skin diseases.

The "safe and effective amount" refers to that the amount of active ingredient is sufficient to significantly improve the condition or symptom without serious side effects.

Typically, the pharmaceutical composition contains 1-2000 mg of active ingredients/dose, more preferably, contains 10-200 mg of active ingredients/dose. Preferably, the "one dose" is a tablet or an injection needle.

The "pharmaceutically acceptable carrier" refers to one or more compatible solid or liquid fillers or gel materials, which are suitable for human use, and must be of sufficient purity and low toxicity.

The "compatibility" herein refers to that each component in the composition can be mixed with the active ingredient of the invention and among them without significantly reducing the efficacy of the active ingredient.

Some examples of pharmaceutically acceptable carrier include cellulose and its derivatives (such as sodium carboxymethyl cellulose, sodium ethyl cellulose, cellulose acetate, etc.), gelatin, talc, solid lubricant (such as stearic acid, magnesium stearate), calcium sulfate, vegetable oil (such as soybean oil, sesame oil, peanut oil, olive oil, etc.), polyol (such as propylene glycol, glycerol, mannitol, sorbitol, etc.), emulsifier (such as Tween®), wetting agent (such as sodium dodecyl sulfate), colorant, flavor, stabilizer, antioxidant, preservative, pyrogen free water, and the like.

In another preferred embodiment, the β-glycan of the present invention can form a complex with a macromolecular compound or a high polymer through non bonding cooperation.

In another preferred embodiment, the β-glycan of the present invention can be attached to a macromolecular compound or a high polymer by a chemical bond. The macromolecular compound may be biological macromolecules such as high glycans, proteins, nucleic acids, polypeptides, and the like.

There are no special restrictions on the administration methods of the active ingredient or pharmaceutical composition of the invention, and the representative administration methods include but are not limited to: external application, oral, intratumor, rectum, parenteral (intravenous, intramuscle or subcutaneous), etc.

Solid dosage forms include capsules, tablets, pills, powders, and granules.

Among these solid dosage forms, the active ingredient is mixed with at least one conventional inert excipient or carrier such as sodium citrate or calcium phosphate, or one or more following components:
  (a) filler or compatibilizer, for example, starch, lactose, sucrose, glucose, mannitol, and silicic acid;
  (b) binder, for example, hydroxymethyl cellulose, alginate, gelatin, polyvinylpyrrolidone, sucrose and arabic gum;
  (c) humectant, for example, glycerin;
  (d) disintegrant, for example, agar, calcium carbonate, potato starch or cassava starch, alginate, certain composite silicate, and sodium carbonate;
  (e) retarding solvent, such as paraffin;
  (f) absorption accelerator, for example, quaternary amine compound;
  (g) wetting agent, such as cetyl alcohol and glyceryl monostearate;
  (h) adsorbent, for example, kaolin; and/or
  (i) lubricants, for example, talc, calcium stearate, magnesium stearate, solid polyethylene glycol, sodium dodecyl sulfate, or mixtures thereof.

In capsules, tablets and pills, the dosage form may also include a buffer.

The solid dosage form may also be prepared by coating and shell material, such as casings and other materials known in the art. They may comprise an opacifier, and the release of the active ingredient in this composition may be released in a certain portion of the digestive tract in a delayed manner. Examples of the embedded components that can be used are polymeric materials and wax substances.

The liquid dosage forms include pharmaceutically acceptable emulsions, solutions, suspensions, syrups or tinctures. In addition to the active ingredient, the liquid dosage form may comprise an inert diluent conventionally employed in the art, such as water or other solvents, solubilizers, and emulsifiers, e.g., ethanol, isopropanol, ethyl carbonate, ethyl acetate, propylene glycol, 1,3-butanediol, dimethylformamide and oil, in particular cottonseed oil, peanut oil, corn embryo oil, olive oil, castor oil and sesame oil or mixtures of these substances, etc. In addition to these inert diluents, the composition may also comprise assistant such as a wetting agent, an emulsifier, and a suspending agent, a sweetener, a correctant and a spice.

In addition to the active ingredient, the suspension may comprise a suspending agent, such as an ethoxylated isooctadecanol, polyoxyethylene sorbitol and dehydrated sorbitol ester, microcrystalline cellulose, methanol aluminum and agar, or mixtures of these substances, etc.

The composition may comprise physiologically acceptable sterile aqueous or non-aqueous solutions, dispersions, suspensions or emulsions, and sterile powders for reconstitution into sterile injectable solutions or dispersions. Suitable aqueous and non-aqueous carriers, diluents, solvents or excipients include water, ethanol, polyol, and suitable mixtures thereof.

When using the pharmaceutical composition, a safe and effective amount of a composition according to the present invention is administered to a mammal (e.g., human) in need of treatment, wherein the administration dosage is the effective dosage considered effective in pharmacy. For people with a body weight of 60 kg, the daily dose is usually 1-10000 mg, preferably 10-2000 mg, more preferably 20-1000 mg. Of course, the specific dosage should also consider the factors such as the administration route and the patient's health status, which are all within the skill range of a skilled physician.

The present invention also provides a composition product comprising:

(1) a first pharmaceutical composition containing (a) a first active ingredient of β-glucan; and (b) a pharmaceutically, cosmetics, or device acceptable carrier or excipient;

(2) a second pharmaceutical composition, which is different from the drugs for the treatment of acne and/or steroid-dependent dermatitis, or skin mucosal inflammation or other skin diseases.

The compositions of the present invention may be administered alone or in combination with other therapeutic drugs (which can be prepared in the same pharmaceutical composition).

The pharmaceutical compositions of the present invention may also be used in combination with other drugs known to treat or improve similar symptoms. When administered in combination, the administration mode and dose of the original drug remain unchanged, and the pharmaceutical composition of the invention is used simultaneously or subsequently. The drug combination also includes the use of the pharmaceutical compositions of the present invention with other one or more known drugs in the overlapping time period. When the pharmaceutical compositions of the present invention is administered in combination with one or more other drugs, the dosage of pharmaceutical composition of the present invention or a known drug may be at lower doses than that when they are administered alone.

The Main Advantages of the Present Invention Include (a) The β-glucan (such as *Schizophyllum* β-glucan) of the present invention can prevent and/or treat acne and/or steroid-dependent dermatitis effectively.
(b) The β-glucan of the present invention treat acne and/or steroid-dependent dermatitis with very low side effects, without destroying the ecological balance of the flora of the skin surface, and without harming the patient's skin to make it resist.
(c) The β-glucan of the present invention can not only be used to prevent and/or treat acne and/or steroid-dependent dermatitis, but also enhance skin active defense function, excite cellular basic immunity, and prevent excessive inflammation. It has two-way immune adjustment function, which can resist bacteria, reduce inflammation and repair skin, prevent and/or treat skin mucosa inflammation or other skin inflammatory disease, dryness, ruddiness, allergy, inflammation, fine lines, color spots, greasiness, etc.
(d) The β-glucan of the present invention combined with other drugs for acne and/or steroid-dependent dermatitis can further enhance the prevention and/or treatment effect, and has a synergistic effect.
(e) The β-glucan (preferably *Schizophyllum* β-glucan) of the present invention is biological polysaccharide of natural origin, having a complete solubility or natural solubility, and has not undergone any chemical and/or physical modified or modification.
(f) The β-glucan of the present invention completely retains the three-dimensional conformation of the triple helix, and has better activity in the prevention and/or treatment of acne and/or steroid-dependent dermatitis.
(g) The β-glucan of the present invention has excellent stability, which can coexist with most substances and maintain its activity, so it has a wide range of applications. It can be used in combination with other acne and/or steroid-dependent dermatitis treatment drugs or skin care products to prevent and treat acne and/or steroid-dependent dermatitis, and improve skin quality at the same time.

The present invention is further explained below in conjunction with specific example. It should be understood that these examples are only for illustrating the present invention and not intend to limit the scope of the present invention. The conditions of the experimental methods not specifically indicated in the following examples are usually in accordance with conventional conditions as described in Sambrook et al., Molecular Cloning: A Laboratory Manual (New York: Cold Spring Harbor Laboratory Press, 1989), or according to the conditions recommended by the manufacturer. Unless otherwise stated, percentages and parts are percentages by weight and parts by weight.

The experimental methods used in the following examples are all conventional methods unless otherwise specified.

The materials, reagents and equipment and the like used in the following examples can be obtained from commercial pathway unless otherwise specified.

Example 1 Production and Determination of β-Glucan

The present example only takes β-glucan obtained by *Schizophyllum* fermentation as an example, but is not limited thereto.

1 the Acquisition of the *Schizophyllum* Fermentation Liquid

The fermentation liquid in the following examples obtained by fermentation of *Schizophyllum* strains (*Schizophyllum Schizophyllum commune* FR-1003, Product Catalog: ATCC®38548™, purchased from American Type Culture Collection [ATCC]), and the details are as follows:

1. *Schizophyllum* strains activation: potato 200 g/L, glucose 30 g/L, sodium chloride 10 g/L, agar 20 g/L were made into plate culture medium. *Schizophyllum* strains were inoculated on the plate culture medium and cultured in 25° C. constant temperature incubator for 7 days to obtain plate mycelia.
2. Seed activation: the liquid culture medium made of potato starch 100 g/L, glucose 40 g/L, yeast extract 2 g/L, yeast powder 2 g/L and water was put into a shake flask with ⅓ liquide volume. The plate mycelia obtained by step 1 was inoculated into the shake flask, shaken in a constant temperature shaker at 25° C. for 7 days at 160 rpm, and used as seed liquid.
3. Fermentation culture: the fermentation medium made of glucose 5 g/L, sucrose 50 g/L, soy powder (Shandong Zhaoyuan Wen Ji Food Co., Ltd.) 5 g/L, yeast powder 2 g/L, potassium dihydrogen phosphate 0.5 g/L, magnesium sulfate heptahydrate 0.5 g/L, ammonium sulfate 0.5 g/L, potassium nitrate 6 g/L and water was added into fermentor at 121° C. for 15 minutes to sterilization. Then the seed liquid obtained by step 2 was inoculated into the above fermentor, stirring at 300 rpm and ventilating at 4 Lpm for fermentation culture at 25° C., to obtain *Schizophyllum* fermentation liquid.

2 Separation and Purification of β-Glucan and Preparation of β-Glucan Solution (1) The *Schizophyllum* fermentation liquid obtained by the above first part was mixed with 4 times volume of distilled water and soaked at 60° C. for 8 h, to obtain a soaking liquid.
(2) The soaking liquid obtained by step (1) was centrifuged at 4,000 rpm for 5 min to get the supernatant; the supernatant was filtered with 300 mesh filter cloth under negative pressure, and the filtrated supernatant was taken out for use, which is soaking supernatant.
(3) The soaking supernatant after filtration in step (2) was heated to 50° C., while 200 mesh wooden activated carbon and 8-16 mesh coconut shell activated carbon were added, and the volume of each kind of activated carbon was 1% of the volume of the liquid. The mixture was stirred at 50° C. and 350 rpm for 4 h, and cooled for further use. Then the soaking supernatant mixed with activated carbon was obtained. The soaking supernatant mixed with activated carbon was sequentially filtered with 300 mesh filter cloth and SCP-321 #filter plate (the pore size is about 1.5 m) under negative pressure, and the filtered liquid was taken for further use.
(4) Solarbio lipase (L8070, enzyme activity of 100-400 U/mg) was dissolved in physiological phosphate buffer, and the lipase solution was added to the filtrate prepared by step (3) according to the enzyme dosage of 10 U/mL, stirring followed by enzymatic hydrolyzation at 40° C. for 2 h. Then Solarbi neutral protease (Z8030, enzyme activity≥60 U/mg) was dissolved in the physiological phosphate buffer, and the neutral protease solution was added to the above enzymatic hydrolysate according to the enzyme dosage of 60 U/mL, stirring followed by enzymatic hydrolyzation at 40° C. for 2 h. After enzymatic hydrolyzation, the mixture was heated in water bath 90° C. for 30 min to inactivate enzyme, then filtered with SCP-321 #filter plate (pore size about 1.5 m) under negative pressure, and the filtered liquid wad taken for further use.
(5) The filtered liquid in step (4) was fast mixed with 95% edible alcohol (volume ratio of 1:3), stirred until precipitates were obtained; then the precipitates were re-dissolved to the original volume, and fast mixed with 95% edible ethanol (volume ratio of 1:3), and stirred until precipitates were obtained.
(6) The precipitates obtained by step (5) were placed in a hole tray, dried at 40° C. in an electric oven until constant weight, and the dry product was obtained.
(7) The β-glucan dry product obtained by the above step (6) was crushed, weighing 5 g of the crushed matter, dissolved in 1,000 ml of ultra-pure water, maintaining 600 rpm and stirring for 2 h, until β-glucan was fully dissolved, the β-glucan solution was obtained. After the above β-glucan solution was filtered with a 5 m filter membrane under negative pressure, and an appropriate amount of cosmetic preservative was added, a high viscosity, high light transmittance β-glucan solution with a concentration of 0.5% can be obtained.

The light transmittance of the β-glucan solution having a mass concentration of 0.5% in 600 nm wavelength (detected by spectrophotometer) can reach 90%, and the viscosity of that can reach more than 600 mPa·s at 40° C.

3 Identification and Detection of β-Glucan

1. Identification of β-Glucan by Infrared Spectroscopy

The above 0.5% β-glucan solution was identified in accordance with the method C in Appendix IV of Chinese Pharmacopoeia (2010 version) by infrared spectroscopy. The samples dried at 105° C. were full wave scanned by Fourier transform infrared spectrometer. Result shows that the 0.5% solution obtained in step (7) of the second part of Example 1 is β-glucan solution.

Compared with the infrared spectrum of yeast β-glucan in yeast β-glucan industry standard QBT 4572-2013, the position of functional group is in good agreement. As shown in FIG. 1, the position of main functional groups are as follows:

1) there is an intense, wide absorption peak near 3301 cm$^1$ (stretching vibration absorption peak of sugar O—H bond)
2) there is a weak absorption peak near 2921 cm$^1$ (stretching vibration absorption peak of sugar C—H bond)
3) there is a weak absorption peak near 886 cm$^{-1}$ (vibration absorption peak of sugar R configuration characteristics)
4) there is a intense absorption peak near 1076 cm$^{-1}$ (stretching vibration absorption peak of sugar C—OH, C—O—C)

Fourier transform infrared spectrum test results show that the product obtained in this example was β-glucan.

2. Detection of β-Glucan Content

The dry product obtained by step (6) of the second part of Example 1 was quantitatively detected for β-glucan, specifically, according to the yeast β-glucan content determination method of yeast β-glucan industry standard QBT 4572-2013. The obtained β-glucan dry product sample was ground to a diameter of about 1.0 mm before proceeding. The β-glucan content in the result product was 99.23%.

3. Hormone Detection of the β-Glucan Solution

The above 0.5% β-glucan solution was measured for 48 hormones, specifically, according to Safety and Technical Standards for Cosmetics (2015 Edition) Chapter four 2.4 Estriol and other 7 components, The First method, High-pressure liquid chromatography-diode array detector and GB/T24800.2-2009 Determination of 41 glucocorticoids in cosmetics, Liquid chromatography/tandem mass spectrometry and thin layer chromatography method. Results show that the above hormones were not detected in the 0.5% β-glucan solution obtained by step (7) of the second part of Example 1 (results are shown in Table 2).

TABLE 2

| | | Determination of 48 hormones | | | |
|---|---|---|---|---|---|
| Serial number | Category | Hormone component | Detection result (μg/g) | Detection limit (μg/g) | Detection method |
| 1 | Sex hormone | Estriol | not detected | 40 | Safety and Technical Standards for Cosmetics (2015 Edition) Chapter four 2.4 Estriol and other 7 components The First method High-pressure liquid chromatography-diode array detector |
| 2 | | Estrone | not detected | 80 | |
| 3 | | Diethylstilbestrol | not detected | 20 | |
| 4 | | Estradiol | not detected | 40 | |
| 5 | | Testosterone | not detected | 4 | |
| 6 | | Methyl testosterone | not detected | 4 | |
| 7 | | Progesterone | not detected | 6 | |
| 8 | Glucocorticoid | Prednisone | not detected | 0.03 | GB/T24800.2-2009 |
| 9 | | Cortisone | not detected | 0.03 | GB/T24800.2-2009 |
| 10 | | Prednisolone | not detected | 0.03 | GB/T24800.2-2009 |
| 11 | | Hydrocortisone | not detected | 0.03 | GB/T24800.2-2009 |
| 12 | | Methylprednisolone | not detected | 0.03 | GB/T24800.2-2009 |
| 13 | | Fluorometholone | not detected | 0.03 | GB/T24800.2-2009 |
| 14 | | Betamethasone | not detected | 0.03 | GB/T24800.2-2009 |
| 15 | | Dexamethasone | not detected | 0.03 | GB/T24800.2-2009 |
| 16 | | Triamcinolone | not detected | 0.03 | GB/T24800.2-2009 |
| 17 | | Prednisone acetate | not detected | 0.03 | GB/T24800.2-2009 |
| 18 | | Cortisone acetate | not detected | 0.03 | GB/T24800.2-2009 |
| 19 | | Prednisolone acetate | not detected | 0.03 | GB/T24800.2-2009 |
| 20 | | Hydrocortisone acetate | not detected | 0.03 | GB/T24800.2-2009 |
| 21 | | Beclomethasone | not detected | 0.03 | GB/T24800.2-2009 |
| 22 | | Flumetasone | not detected | 0.03 | GB/T24800.2-2009 |
| 23 | | Methylprednisolone acetate | not detected | 0.03 | GB/T24800.2-2009 |
| 24 | | Fluorometholone acetate | not detected | 0.03 | GB/T24800.2-2009 |
| 25 | | Fluhydrocortisone acetate | not detected | 0.03 | GB/T24800.2-2009 |
| 26 | | Budesonide | not detected | 0.03 | GB/T24800.2-2009 |
| 27 | | Hydrocortisone butyrate | not detected | 0.03 | GB/T24800.2-2009 |
| 28 | | Triamcinolone acetonide | not detected | 0.03 | GB/T24800.2-2009 |
| 29 | | Dexamethasone acetate | not detected | 0.03 | GB/T24800.2-2009 |
| 30 | | Betamethasone acetate | not detected | 0.03 | GB/T24800.2-2009 |
| 31 | | Flurandrenolide | not detected | 0.03 | GB/T24800.2-2009 |
| 32 | | Deflazacort | not detected | 0.03 | GB/T24800.2-2009 |
| 33 | | Hydrocortisone valerate | not detected | 0.03 | GB/T24800.2-2009 |
| 34 | | Halcinonide | not detected | 0.03 | GB/T24800.2-2009 |
| 35 | | Clobetasol propionate | not detected | 0.03 | GB/T24800.2-2009 |
| 36 | | Betamethasone valerate | not detected | 0.03 | GB/T24800.2-2009 |
| 37 | | Triamcinolone acetonide acetate | not detected | 0.03 | GB/T24800.2-2009 |
| 38 | | Clobetazone butyrate | not detected | 0.03 | GB/T24800.2-2009 |
| 39 | | Perdnicarbate | not detected | 0.03 | GB/T24800.2-2009 |
| 40 | | Diflorasone diacetate | not detected | 0.03 | GB/T24800.2-2009 |
| 41 | | Fluocinolone acetate | not detected | 0.03 | GB/T24800.2-2009 |
| 42 | | Amcinonide | not detected | 0.03 | GB/T24800.2-2009 |
| 43 | | Betamethasone dipropionate | not detected | 0.03 | GB/T24800.2-2009 |
| 44 | | Beclomethasone dipropionate | not detected | 0.03 | GB/T24800.2-2009 |

TABLE 2-continued

Determination of 48 hormones

| Serial number | Category | Hormone component | Detection result (μg/g) | Detection limit (μg/g) | Detection method |
|---|---|---|---|---|---|
| 5 | | Mometasone Furoate | not detected | 0.03 | GB/T24800.2-2009 |
| 6 | | Alclometasone Dipropionate | not detected | 0.03 | GB/T24800.2-2009 |
| 7 | | Fluticasone propionate | not detected | 0.03 | GB/T24800.2-2009 |
| 8 | | Triamcinolone diacetate | not detected | 0.03 | GB/T24800.2-2009 |

4. Viscosity Measurement of β-Glucan Solution

The β-glucan aqueous solution of 0.3%, 0.5%, 0.8%, 1.0% (mass volume ratio) was formulated according to the step (7) of second part of Example 1, and dynamic viscosity was detected at 25° C., respectively. The results are shown in Table 3, with the increase of β-glucan content, the viscosity of each sample was also incremented, which was 472, 740, 2150, and 3100 mPa·s, respectively.

The commercially available dispersible (insoluble in water) yeast β-glucan particles (purchased from Wellmune) were accurately weighed of 2 g, deionized water was added and mixed at a constant volume of 200 mL to obtain a yeast β-glucan suspension with a mass/volume ratio of 1.0%. The dynamic viscosity was detected at 25° C. As a result, the dynamic viscosity of the 1.0% yeast β-glucan suspension was 0 mPa·s (see Table 3).

The commercially available soluble yeast β-glucan powder (purchased from Wellmune) were accurately weighed of 2 g, deionized water was added and mixed at a constant volume of 200 mL to obtain a yeast β-glucan aqueous solution with a mass/volume ratio of 1.0%. The dynamic viscosity was detected at 25° C. As a result, the dynamic viscosity of the 1.0% yeast β-glucan aqueous solution was 0 mPa·s (see Table 3).

The method of determination of the above dynamic viscosity is as follows:
(1) taking 200 mL of the above solution samples and placing them in a 250 mL beaker;
(2) placing the beaker with the above solution/mixture sample in the water bath, and keeping warm at 25° C. for 1 h;
(3) detecting the dynamic viscosity of each sample at 25° C. using a rotating viscometer.

5 Determination of Light Transmittance of β-Glucan Solution

The β-glucan solution of 0.3%, 0.5%, 0.8%, 1.0% (mass volume ratio) was formaulated according to the step (7) of second part of Example 1, and the light transmittance of the solution was measured at the wavelength of 600 nm. The results are shown in Table 3, the light transmittance of each sample was 96.5%, 93.1%, 87.5% and 81.1%, respectively.

A commercially available 1.0% oat β-glucan solution (purchased from Symrise) was taken, and the light transmittance of the solution was measured at the wavelength of 600 nm. As a result, the light transmittance was 59.7% (see Table 3).

The commercially dispersible yeast β-glucan particles were accurately weighed of 2 g, deionized water was added and mixed at a constant volume of 200 mL to obtain a yeast β-glucan suspension with a mass volume ratio of 1.0%. The light transmittance of the suspension was measured at the wavelength of 600 nm. As a result, the light transmittance was 1.3% (see Table 3).

The commercially soluble yeast β-glucan powder (purchased from Wellmune) were accurately weighed of 2 g, deionized water was added and mixed at a constant volume of 200 mL to obtain a yeast β-glucan aqueous solution with a mass/volume ratio of 1.0%. The light transmittance of the solution was measured at the wavelength of 600 nm. As a result, the light transmittance was 68.4% (see Table 3).

The method of determination of the above light transmittance is as follows:

(1) taking 10 mL of the above solution samples and placing in the centrifuge tube;
(2) centrifuging at a low speed of 1000 rpm for 1 min to remove bubbles (two yeast β-glucan solution/suspension were bubble-free, without centrifugation);
(3) taking 3 ml to 1 cm glass cuvette carefully to avoid bubbles;
(4) measuring the light transmittance of samples at a wavelength of 600 nm using spectrophotometer, and taking deionized wate as the blank reference (the light transmittance of deionized water is 100% meter).

6 Determination of Stability of β-Glucan Solution

Figure 2:
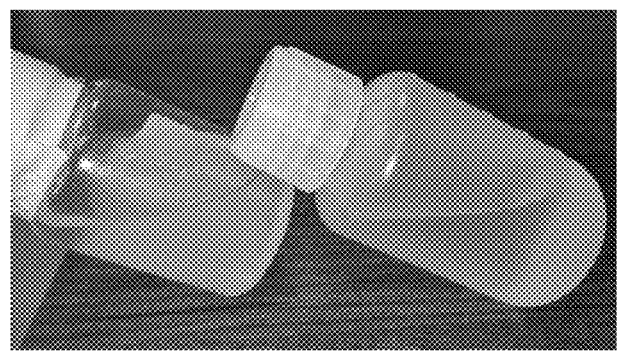
FIG. 2 shows a comparison of β-glucan stability, wherein the bottle on the left is a commercially available 1.0% oat β-glucan solution, and the bottle on the right is a 1.0% *Schizophyllum* β-glucan prepared by the present invention.

The β-glucan aqueous solution of 0.5%, 0.8%, 1.0% (mass volume ratio) was formaulated according to the step (7) of second part of Example 1, added preservatives, and then placed at room temperature (unsteady) for 24 months. The stability of the solution was observed and the dynamic viscosity and light transmittance of solution were detected. As a result, the above three solution states were very stable, and the viscosity and light transmittance had little change, and the transmittance even increased (see FIG. 2, Table 3).

The commercially available 1.0% oat β-glucan solution were taken, and was placed at room temperature (unsteady) for 24 months. The stability of the solution was observed and the dynamic viscosity and light transmittance of solution were detected. As a result, the 1.0% oat β-glucan solution was very unstable, and there was a solid precipitation after 3 months at room temperature, which made the viscosity and light transmittance of it unable to be detected (see FIG. 2, Table 3).

TABLE 3

Dynamic viscosity data of various β-glucan solution

| Solution Serial number | β-glucan Origin | β-glucan concentration (%) | Dynamic viscosity (mPa·s, 25° C.) Start | 24 months later | Light Transmittance (%) Start | 24 months later | Stability |
|---|---|---|---|---|---|---|---|
| 1 | Schizophyllum | 0.3 | 472 | — | 96.5 | — | — |
| 2 |  | 0.5 | 740 | 740 | 93.1 | 98.2 | Stable solution |
| 3 |  | 0.8 | 2150 | 1860 | 87.5 | 90.9 | Stable solution |
| 4 |  | 1.0 | 3100 | 3080 | 81.1 | 81.8 | Stable solution |
| 5 | Oat | 1.0 | — | not detected | 59.7 | not detected | Precipitate |
| 6 | Yeast [a] | 1.0 |  | 0 |  | 1.3 | — |
| 7 | Yeast [b] | 1.0 |  | 0 |  | 68.4 | — |

Note:
[a] is commercially available dispersible yeast β-glucan particles (insoluble in water),
[b] is a commercially available soluble yeast β-glucan powder.

Example 2 Evaluation of the Effect of β-Glucan on the Skin

1. Observation Object 20 volunteers, aged 21-50, were recruited. There were no strict rules on skin problems. Anyone who thought the skin condition needed to be improved could join voluntarily.

2. Method of Use

The β-glucan solution prepared in Example 1 with a concentration of 5 mg/mL was diluted with commercially available toner to 1 mg/mL, and after cleansing, it was directly applied to the face skin. The use period is 2 months.

3. Results and Analysis

1) Acne

By this trial, the present inventors unexpectedly discovered for the first time that the β-glucan solution prepared in Example 1 had the effect of preventing and treating acne.

Among 20 volunteers, 8 volunteers had varying degrees of acne: severe cystic acne, and as well as occasional papular acne. However, it was basically similar in the trial result, that is, all patients reflected that the acne appeared less and disappeared faster after 2 weeks of trial. After 2 months of trial, the efficiency of β-glucan solution on acne reached 100%.

Figure 3:
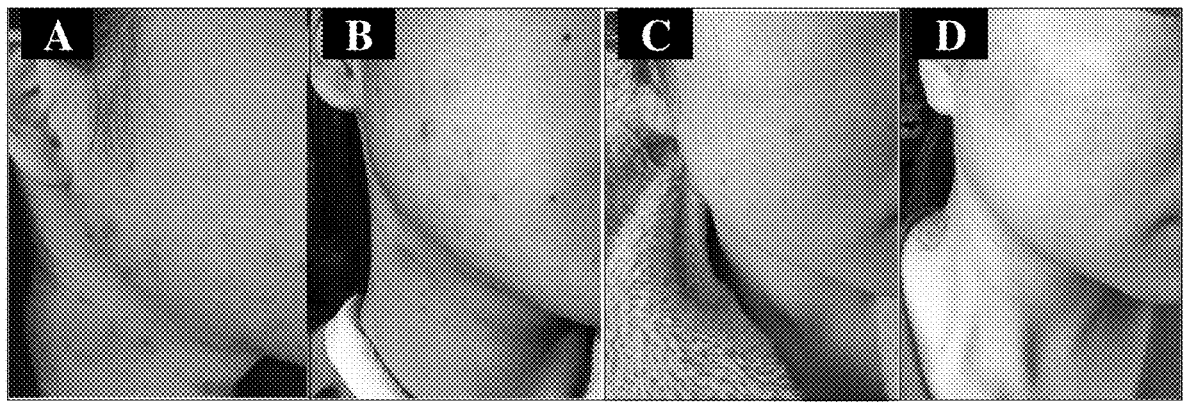
FIG. 3 shows the effect of *Schizophyllum* β-glucan on the skin.

The improvement of skin problems such as acne and ruddiness is shown in FIG. 3. FIGS. 3A and 3B show a comparison of the photos of a patient with severe acne before (FIG. 3A) and after (FIG. 3B) the trial of administrating β-glucan product. After 1 months of trial, the patient's acne decreased and the new growth one could regress quickly (FIG. 3B). FIGS. 3C and 3D show the effect comparison of another patient with mild acne and ruddiness before (FIG. 3C) and after (FIG. 3D) the trial. After 1 months of trial, the patient had less acne, reduced the degree of facial redness and smoothed skin.

2) Skin Problems Other than Acne

The β-glucan prepared by the method of Example 1 not only has significant effects on preventing and treating acne and improving ruddiness, but also has excellent effects on dry skin, peeling, allergies, fine lines, color spots and greasiness, etc.

TABLE 4

Improvement effects of β-glucan trial products on other skin problems except acne

|  | Skin problems | | | | | | |
|---|---|---|---|---|---|---|---|
|  | Dry | Peeling | Allergy | Fine lines | Color spots | Greasiness | Ruddiness |
| Number of people with problems | 8 | 2 | 3 | 3 | 2 | 3 | 1 |
| Number of positive feedback | 8 | 2 | 3 | 2 | 1 | 2 | 1 |

It can be seen from Table 4 that, except for acne, the most positive feedback was dry skin, and 8 people said it was effective. The second was allergies, which was effective for 3 people. For peeling, fine lines and oil control, it was effective for 2 people each, while for spots and ruddiness, it was effective for one person each.

Example 3 Statistics of Effect of Common Acne Patients Trying β-Glucan

1. Observation Object 25 patients with common acne, aged 10-36 years old, were recruited, wherein including 8 male patients and 17 female patients. The course of acne ranges from 2 months to 16 years. Patients have different degrees of acne lesions, such as papular acne, pustular acne, cystic acne, nodular acne, etc., and they were not treated differently.

2. Method of Use

The β-glucan solution prepared in Example 1 with a concentration of 5 mg/mL was diluted with pure water to 1 mg/mL, and an appropriate amount of preservative was added. After the patient cleansing, it was applied directly to the face skin. Use it twice a day on average for 8 weeks, the trial effect was evaluated at 3 days, 1 week, 2 weeks, 4 weeks, and 8 weeks of use.

3. Evaluation Index

The evaluation indexes after the trial are as follows:
1) Recovery: the original acne is completely resolved, and there is no longer new acne occurrence;
2) Basically recovery: the original acne is completely resolved, and occasionally there is new acne occurrence, but it is very small, and can quickly subside;
3) Relief: The original acne is partially resolved, and occasionally there is new acne occurrence, but the regression speed is accelerated;
4) Invalid: The original acne is basically not resolved, and the new acne is out of control;
5) Aggravation: The extent of the original acne is aggravated, and the new acne occurs constantly.

4. Results Analysis

The statistics results of the trial are shown in Table 5.
1) After 3 days of use: The symptoms of 3 patients were relieved; a patient had aggravated symptoms and continued to use it with our prior notice. The effective rate is 12%.
2) After 1 week of use: The patient with aggravated symptoms after 3 days use was effectively alleviated; another 4 patients had aggravated symptoms, and the above patients had continued to use. The effective rate is 16%.
3) After 2 weeks of use: 2 patients were basically cured; the 4 patients with aggravated symptoms after 1 week use were effectively alleviated, and another 17 patients also reported regression of symptoms, and the symptoms of 21 patients were effectively alleviated. The effective rate is 92%.
4) After 4 weeks of use: 2 patients were cured, 12 patients were basically cured; 10 patients were relieved. The effective rate is 96%;
5) After 8 weeks of use: 7 patients were cured, 16 patients were basically cured; 2 patients were relieved. The effective rate is 100%.

TABLE 5

Statistics of effect of common acne patient trying β-glucan prepared by method of Example 1

| | Index | | | | | | |
|---|---|---|---|---|---|---|---|
| | Improvement and improved extent (person) | | | | | | |
| Time | Recovery | Basically recovery | Relief | Invalid (person) | Aggravation (person) | Total number (person) | Effective rate (%) |
| 3 days | 0 | 0 | 3 | 21 | 1 | 25 | 12 |
| 1 week | 0 | 0 | 4 | 17 | 4 | 25 | 16 |
| 2 weeks | 0 | 2 | 21 | 2 | 0 | 25 | 92 |
| 4 weeks | 2 | 12 | 10 | 1 | 0 | 25 | 96 |
| 8 weeks | 7 | 16 | 2 | 0 | 0 | 25 | 100 |

Example 4: Individual Case Analysis of the Effect of Acne Patient Trying β-Glucan According to the trial effect in Example 2, the prevention and improvement effect of β-glucan products on acne were investigated. Patients with acne of varying degrees were purposefully selected for investigation, regardless of gender. The results are shown in FIG. 4 to FIG. 7.

Figure 4:
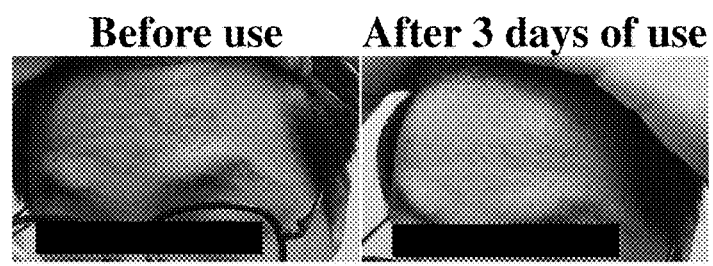
FIG. 4 shows the comparison of the effect of patient A before and after the trial of administrating *Schizophyllum* β-glucan product in Example 4.

1) The trial results of an adolescent male patient A with mild acne are shown in FIG. 4. After 3 days of using the product containing 1 mg/mL β-glucan (aqueous solution) prepared in Example 1, the patient's problems such as skin acne and roughness caused by night shift were effectively improved. In addition, it was found that the re-formation of acne was effectively controlled after the patient used β-glucan product for 2 weeks, and some acne marks were gradually eliminated, showing the role of preventing acne.

2) A female patient B with moderate acne, 27 years old, oily skin. Her acne began to grow on the right face at the age of 19. The acne was more serious one week before menstruation, and improved at the beginning of the menstruation, with periodicity. There was a large amount of oil in the skin on both sides of the alar of the nose, and acne developed from time to time. Before the development of acne, that area would be red, painful, and severely inflammatory, which lasted for a long time. Generally, it would gradually subside in about 10 days.

Before the trial, six or seven acne spots on the right face of the patient were in inflammatory state, and the rest were acne marks. After about 1 weeks of using the product containing 1 mg/mL β-glucan (aqueous solution) prepared in Example 1, the acne area on the right face was red, and after further 2 days of use, the red subsided, and appeared as common acne marks. After that, the patient insisted on using β-glucan products, and no more severe acne appeared on the right face, occasionally small papular acne appeared, which would subside after 1-2 days, and no longer developed into severe acne, indicating the role of preventing acne. Half a year later, the original acne marks have also been partially subsided.

Figure 5:
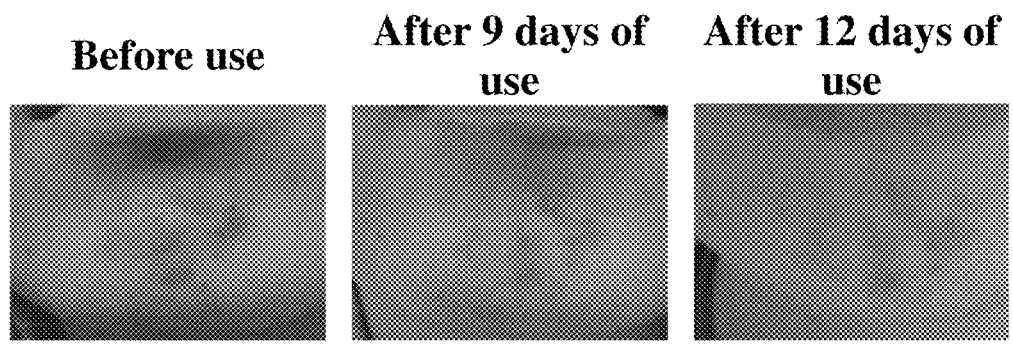
FIG. 5 shows the comparison of the effect of patient B before and after the trial of administrating *Schizophyllum* β-glucan product in Example 4.

Before the trial, the patient had a large area of acne on the jaw, and the skin under the acne was hard, red and swollen, with pain, as shown in FIG. 5. After 9 days of using the product containing 1 mg/mL β-glucan (aqueous solution) prepared in Example 1, the hardening, redness and swelling of the acne area was obviously controlled, and the single acne area gradually reduced, and the redness and swelling subsided by 12 days.

Figure 6:
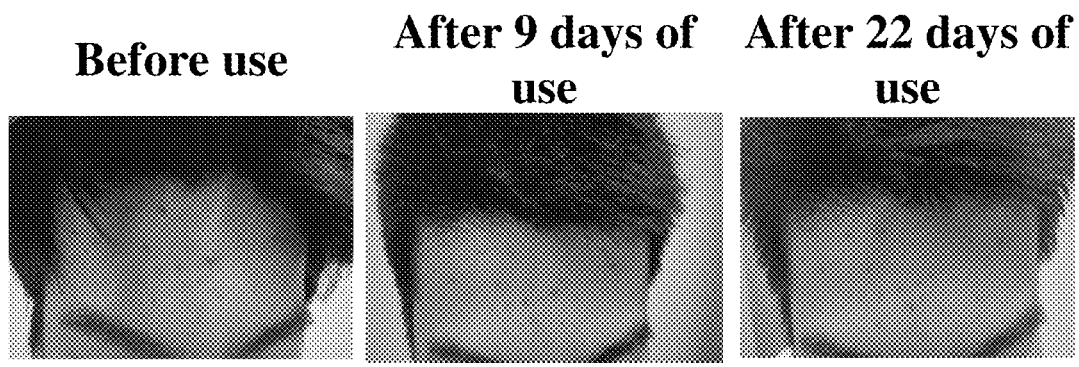
FIG. 6 shows the comparison of the effect of patient C before and after the trial of administrating *Schizophyllum* β-glucan product in Example 4.

3) The effect of a male patient C with mild acne before and after the trial of β-glucan products prepared by Example 1 is shown in FIG. 6. During the course of use, it was found that the product had a significant effect on removing acne and had a preventive effect on acne. After a period of insistent use, acne on the face is under control, and acne marks are gradually fading.

Figure 7:
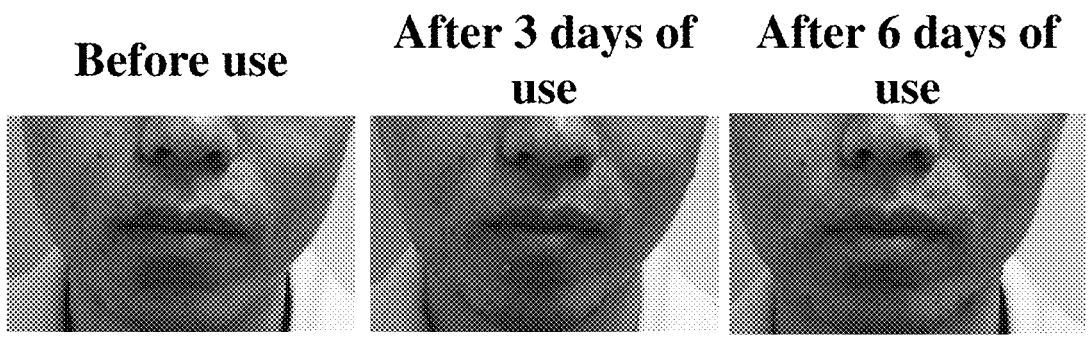
FIG. 7 shows the comparison of the effect of patient D before and after the trial of administrating *Schizophyllum* β-glucan product in Example 4.
Figure 7:
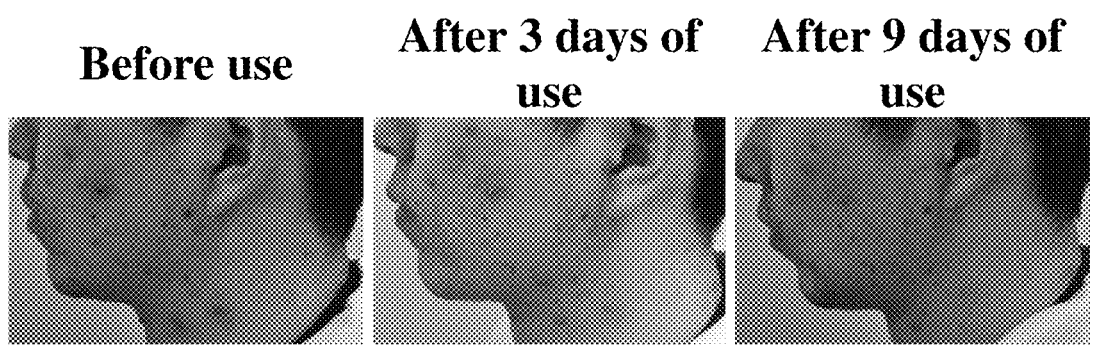

4) The effect comparison of an adolescent male patient D with sereve acne before and after the trial of β-glucan products prepared by Example 1 is shown in FIG. 7. This patient had severe facial and general acne due to the strong secretion of hormones during puberty. For this patient, 1 mg/mL of β-glucan (aqueous solution) product, had a significant inhibitory effect on the formed acne. As shown in FIG. 7, the product would accelerate the healing of acne and inhibit inflammation caused by infection.

Example 5 Anti-Acne Effect of Commercially Available *Schizophyllum* β-Glucan

The commercially available *Schizophyllum* β-glucan was purchased for treatment of acne patients. After testing, the commercially available 1% (i.e., 10 mg/mL) *Schizophyllum* β-glucan had a dynamic viscosity of 120 mPa·s at 25° C. and a light transmittance of 99.9%.

The above commercially available *Schizophyllum* β-glucan was diluted with pure water to 1 mg/mL, and an appropriate amount of preservative was added. After cleansing, it was applied directly to the face skin. After 12 patients with varying degrees of acne tried for 2 months, 4 patients of them were found that the commercially available *Schizophyllum* β-glucan had a relieving effect on acne. The original acne was partially resolved, and occasionally there was new acne occurrence, but the regression speed was accelerated. The other 8 patients reported that the trial product had no therapeutic effect on acne, but the effect of hydrating and moisturizing was better. The above trial results indicate that *Schizophyllum* β-glucan with lower viscosity has a certain therapeutic effect on acne, but it is not as good as *Schizophyllum* β-glucan with high viscosity and high molecular weight prepared in Example 1.

Example 6 Anti-Acne Effect of Commercially Available Soluble Yeast β-Glucan

The commercially available soluble yeast β-glucan powder was purchased, and a 1 mg/mL β-glucan solution was prepared with pure water and an appropriate amount of preservatives was added. It was applied directly to the face skin after cleansing. After 20 patients with varying degrees of acne tried for 2 months, 7 patients of them were found that the commercially available soluble yeast β-glucan had a relieving effect on acne. The original acne was partially resolved, and occasionally there was new acne occurrence, but the regression speed was accelerated. 8 patients reported that the commercially available soluble yeast β-glucan had a slight soothing effect on acne, but there is no obvious effect on the recurrence of new acne. The other 5 patients reported that the trial product had no therapeutic effect on acne. The above trial results indicate that commercially available soluble yeast has a certain therapeutic effect on acne, but it is not as good as *Schizophyllum* β-glucan with high viscosity and high molecular weight prepared in Example 1.

Example 7 Anti-Acne Effect of Commercially Available Dispersible Yeast β-Glucan

The commercially available dispersible (insoluble in water) yeast β-glucan particles were purchased, and the pure water was used to disperse it to 1 mg/mL, and an appropriate amount of preservative was added. After cleansing, the trial product was shaken well and applied directly to the face. After 5 acne patients with varying degrees of acne tried for 2 weeks, it was reported that the trial product had no therapeutic effect on acne, but showed signs of aggravation. Two volunteers with normal skin developed papular acne on their faces after trial for 1 week. The freshly prepared yeast β-glucan particle dispersion was discontinued, and the β-glucan solution prepared in Example 2 was used for 2 days, the papular acne subsided. After that, the freshly prepared yeast β-glucan particles dispersion was tried again for 3 days, papular acne reappeared on the face. The above trial results show that commercially available dispersible yeast β-glucan had irritating effect on skin and was not suitable for direct use on skin.

Example 8 Anti-Acne Effect of Commercially Available Soluble Yeast β-Glucan Combined with *Schizophyllum* β-Glucan The commercially available soluble yeast β-glucan powder was purchased, and was prepared into a yeast β-glucan solution of 1 mg/mL with the pure water. The *Schizophyllum* β-glucan solution prepared in Example 1 was diluted with pure water to 1 mg/mL. The above two solutions were mixed with the ratio of 1:1, and an appropriate amount of preservative was supplemented, to prepare a composite solution in which the content of two kind of β-glucan both are 0.5 mg/mL. After the patients cleansing, the β-glucan composite solution trial product was shaken well and applied directly to the face skin. After 20 patients with varying degrees of acne tried for one month, 13 patients found that the β-glucan composite solution had significant therapeutic effect on acne, the original acne partially or basically subsided, and 5 of them completely subsided. 4 patients reported that the acne redness was aggravated in the early stage of the trial, but after the trial, the acne quickly subsided. 3 patients reported that the β-glucan composite solution had significant relief effect on acne. After 2 months of trial, 9 of the 20 patients were completely cured and 11 were basically cured. The above trial results show that the commercially available soluble yeast β-glucan combined with *Schizophyllum* β-glucan, has a significant therapeutic effect on acne, and the effect is better than two kinds of β-glucans used alone.

Example 9 Anti-Acne Effect of Commercially Available Oat β-Glucan

The commercially available oat β-glucan solution was purchased and diluted with pure water to 1 mg/mL. It was applied directly to the face skin after cleansing. After 15 patients with varying degrees of acne tried for 2 weeks, all reported that the trial product had no therapeutic effect on acne. The above trial results show that the commercially available oat β-glucan has no therapeutic effect on acne.

Example 10 Anti-Acne Effect of Acne Treatment Drugs Combined with β-Glucan

A 12-year-old adolescent girl developed patches of papular acne on the forehead with large inflammatory pustules, spreading to the cheeks and nose. It was clinically recommended to use tretinoin cream and fusidic acid cream in combination to treat acne. The combination of adapalin gel and metronidazole cream was also recommended. After using the above combination, it was found that the above combination had an effect on large-particle inflammatory pustules, but it was not effective on patches of papules, and scurf and peeling appeared after use.

While continuing to use the above-mentioned tretinoin cream and fusidic acid cream, the β-glucan prepared in Example 1 was used for treatment. It was diluted with pure water to 1 mg/mL, and an appropriate amount of preservative was added. After cleansing, it was applied directly to the face skin. After 3 days of use, the original large area of papules gradually subsided, and the peeling was also effectively alleviated. After that, the acne that appeared due to the menstrual cycle could also be effectively controlled, the number of acne was reduced, and the volume of a single acne became smaller and subsided quickly, showing the effect of preventing acne.

Example 11 Preventive Effect of β-Glucan on Acne Recurrence

1. Observation Object

In order to investigate the preventive effect of β-glucan prepared by the method in Example 1 on the recurrence of acne:

1) 58 patients with cyclical recurrent acne, aged 12-38 years old, were recruited, all female patients. The course of acne ranges from 2 months to 18 years. Patients have different degrees of acne lesions, including 32 papular acne patients, 16 pustular acne patients, and 10 cystic acne patients.

2) Tracking 1 female patient and 3 male acne patients in Example 4.

2. Method of Use

The β-glucan solution prepared in Example 1 with a concentration of 5 mg/mL was diluted with pure water to 1 mg/mL, and an appropriate amount of preservative was added. After cleansing, it was applied directly to the face skin, and used twice a day on average.

1) Short-Term Tracking Investigation

After 8 weeks of continuous use, the above different types of patients were randomly divided into continuous use group and discontinuation group. The patients in the continuous use group continued to use β-glucan solution prepared in Example 1 of 1 mg/mL for 8 weeks, patients in the discontinuation group no longer provided trial products. At the 8th week of reuse or discontinuation, the patient were conducted a tracking investigation.

2) Long-Term Tracking Investigation

Patients used β-glucan solution prepared in Example 1 of 1 mg/mL for more than 18 months or longer.

3 Evaluation Index

The recurrence was scored according to the number, diameter, and subsiding time of monthly new occurrence acne. The lower the score, the milder the recurrence, and the higher the score, the more severe the recurrence.

1) 0 Point: There is No Longer New Acne Occurrence;
2) 1 point: micro recurrence, the number of monthly new acne is ≤1, the diameter is ≤2 mm, and subside within 2 days;
3) 2 points: minor recurrence, the number of monthly new acne is 2-5, the diameter is ≤2 mm, and subside within 2 days;
4) 3 points: medium recurrence, the number of monthly new acne is 5-10, the diameter is ≤5 mm, and subside within 3-7 days;
4) 4 points: controllable recurrence, the number of monthly new acne is ≥10 the diameter is M 5 mm, and subside within 7-10 days;
4) 5 points: outbreak, the number of monthly new acne is ≥10, the diameter is ≤5 mm, the subsiding time is −10 days;

4. Trial Results

1) Preventive Effect on Ance Recurrence Due to Menstrual Cycle of Female

Due to menstrual cycle, female patients have recurrence of acne. After 8 weeks of using the β-glucan solution prepared in Example 1, 58 female patients were divided into a continuous use group and a discontinuation group to track the recurrence of acne. The investigation results are shown in Table 6.

TABLE 6

Comparison of effects on ance recurrence due to menstrual cycle of female

| Group | core | Degree of recurrence | Classification and number of patients (pcs) | | | Fraction |
| --- | --- | --- | --- | --- | --- | --- |
| | | | Pimple/papular acne | Pustular acne | Cystic acne | |
| Before use | Number | | 32 | 16 | 10 | — |
| | | No recurrence | — | — | — | — |
| | | Micro recurrence | | | | |
| | | Minor recurrence | 19 (subsiding time ≥7 days) | 2 (subsiding time ≥7 days) | — | 42 |
| | | Medium recurrence | 11 (subsiding time ≥7 days) | 4 (subsiding time ≥7 days) | 2 (subsiding time ≥7 days) | 51 |

TABLE 6-continued

Comparison of effects on ance recurrence due to menstrual cycle of female

| Group | core | Degree of recurrence | Pimple/papular acne | Pustular acne | Cystic acne | Fraction |
|---|---|---|---|---|---|---|
| | | Controlable recurrence | 2 | 5 | 5 | 48 |
| | | Outbreak | — | 5 | 3 | 40 |
| | Total | | | | | 181 |
| Discontinuation group | Number | | 16 | 8 | 5 | — |
| | | No recurrence | 9 | 3 | 1 | — |
| | | Micro recurrence | 4 | 3 | 1 | 8 |
| | | Minor recurrence | 3 | 2 | 2 | 14 |
| | | Medium recurrence | — | — | 1 | 3 |
| | | Controlable recurrence | — | — | — | — |
| | | Outbreak | — | — | — | — |
| | Total | | | | | 25 |
| Continuous use group | Number | | 16 | 8 | 5 | — |
| | | No recurrence | 15 | 5 | 2 | — |
| | | Micro recurrence | 1 | 2 | 2 | 5 |
| | | Minor recurrence | — | 1 | 1 | 4 |
| | | Medium recurrence | — | — | — | — |
| | | Controlable recurrence | — | — | — | — |
| | | Outbreak | — | — | — | — |
| | Total | | | | | 9 |

Before using the β-glucan solution prepared in Example 1, the recurrence of acne was shown in Table 6. The recurrence rate of acne was 100% in 58 patients, and the acne regression time was more than 7 days. Calculated according to the scoring rules, the recurrence score was as high as 181 points (the average score after half-grouping is 90.5 points).

The recurrence rate of acne patients in discontinuation group was 55%, which was significantly lower than that before using β-glucan solution (100%). And the recurrence was very mild, the number of new acne was small, the area was small, and there was no inflammation. Generally, it subsided completely in 2-3 days without leaving acne marks. According to the scoring rules, the recurrence score of discontinuation group was only 25 points.

The recurrence rate of acne in the continuous use group was significantly lower than that in discontinuation group (24%). And the recurrence was milder, the number of new acne was small, the area was small, and there was no inflammation. Generally, it subsided completely within 1-2 days without leaving acne marks. According to the scoring rules, the recurrence score of continuous use group was only 9 points.

The comparative test results show that the β-glucan solution prepared in Example 1 has a very obvious preventive effect on acne recurrence of patient, and with the extension of the use time, the prevention effect is more obvious.

2) Periodic Recurrence of Acne in Male

A tracking investigation was conducted on 3 male patients in Example 4, wherein patient A and patient C continued to use for 8 weeks after the end of the first round of trial, and patient D stopped using the β-glucan prepared by the present invention after the end of the first round of trial, changed to a combination therapy of oral Chinese medicine and other anti-acne drugs for external use.

In the first round of trial, the acne of patients A and C had been effectively controlled and basically cured. During the 8 weeks of continued use, no new acne formed. The second round was stopped after 8 weeks, and no recurrence was found in half a year. At the end of the first round of trial, the acne of patient D was effectively relieved; after changing to a combination therapy of oral Chinese medicine and other anti-acne drugs for external use, acne was also effectively controlled. However, the acne still recurred after the drug was stopped, and the degree was not significantly reduced.

3) Prevention of Long-Term Use of Patients

Patient B and another patient E used the β-glucan solution prepared in Example 1 and diluted to 1 mg/mL with pure water for a long period of time. Patient B has used it for 18 months. The current skin condition is good, acne is effectively prevented, and no recurrence, acne marks have basically subsided, and the skin is healthy, smooth and plumper, without adverse side effects.

Patient E, a 38 years old female, has used it for 30 months. In addition to the effective prevention of acne and no recurrence, all acne marks and acne scars subsided. The original fine lines are gradually reduced, and the skin is healthy, smooth and plumper, without adverse side effects.

Example 12 Anti-Acne Skin Care Products

This embodiment provides seven kinds of skin care products such as anti-acne essence, and the formulation of anti-acne skin care products is shown in Table 7.

TABLE 7

Formulation of anti acne skin care products with β-glucan as the main functional ingredient

| Ingredient | Addition amount (%) | | | | | | |
|---|---|---|---|---|---|---|---|
| | Formula 1 | Formula 2 | Formula 3 | Formula 4 | Formula 5 | Formula 6 | Formula 7 |
| β-glucan (Prepared by method of Example 1) | 0.2 | 0.1 | 0.05 | 0.3 | 0.2 | 0.2 | 0.15 |
| 1,3-butanediol | 3 | 3 | 2 | 5 | 3 | 2 | 2 |
| 1,3-propanediol | 2 | 2 | 3 | 3 | 2 | 3 | 3 |
| Polyethylene glycol 400 | 2 | 2 | 1 | 2 | 1 | 2 | 1 |
| Glycerin | 0.5 | 2 | 2 | 2 | 1 | 1 | 0.5 |
| Water soluble silicone oil | 0 | 0 | 0 | 2 | 0 | 0 | 0 |
| Salicylic acid | 0 | 0 | 0 | 2 | 0 | 1 | 0 |
| Pullulan | 0 | 1 | 1 | 0 | 2 | 0 | 0 |
| Octanoic/capric triglyceride | 0 | 0 | 0 | 1 | 0 | 0 | 0 |
| Tea tree oil | 0 | 0 | 1 | 0 | 0.5 | 0 | 0.5 |
| Root/Cortex moutan extract | 0 | 0.3 | 0 | 0.2 | 0 | 0.3 | 0 |
| Chrysanthemi Indici Flos extract | 0 | 0.2 | 0.3 | 0.1 | 0 | 0 | 0 |
| Hyaluronic acid | 0.1 | 0.1 | 0.2 | 0 | 0 | 0.1 | 0.2 |
| Copper peptide | 0 | 0 | 0.01 | 0.01 | 0 | 0.01 | 0 |
| silver | 0 | 0 | 0 | 0 | 0.0008 | 0 | 0.0004 |
| Deionized water | 92.2 | 89.3 | 89.44 | 82.39 | 90.3 | 90.39 | 92.65 |

The skin care products such as the anti-acne essence formulated according to Table 7 was applied to the facial skin after cleansing in the morning and evening. It was used twice a day on average for 8 weeks, and the trial effect was evaluated. The results show that the above anti-acne skin care products can significantly treat acne, accelerate the regression of acne, eliminate acne marks, effectively control the recurrence of acne, and have the effect of preventing acne.

Figure 8:
FIG. 8 shows the changes in facial acne after patient F tried a facial mask with *Schizophyllum* β-glucan as the main active ingredient in Example 13.
Figure 8:
Figure 8:
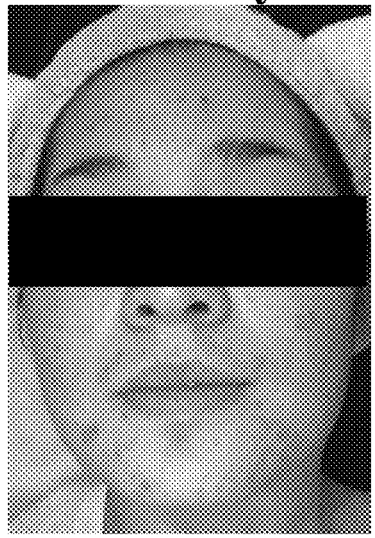
Figure 8:
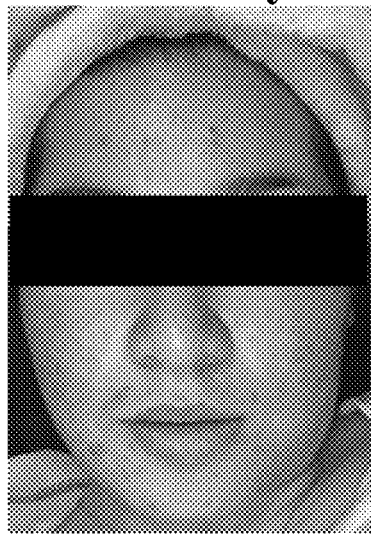

Example 13 Improvement Effect of a Facial Mask Prepared with β-Glucan as the Main Active Ingredient on Acne The mask was prepared according to the formulation of Table 8. A 25-year-old female patient F with long-term acne (The course of disease was 3 years, and the treatment was not stopped during the period, but there was no effect) used one piece everyday. The improvement of facial acne is shown in FIG. 8. On the 3rd-4th day of use, acne was reddening and aggravating, but it was still on trial. On the 7th day, it was obviously improved. B the 13th day, the acne had basically subsided, leaving only acne marks.

TABLE 8

Preparations with the effect of preventing and/or treating acne

| Ingredient | Addition amount (%) |
|---|---|
| β-glucan (Prepared by method of Example 1) | 0.025 |
| Glyceryl caprylate | 0.45 |
| Allantoin | 0.2 |
| Hydroxyethyl cellulose | 0.1 |

TABLE 8-continued

Preparations with the effect of preventing and/or treating acne

| Ingredient | Addition amount (%) |
|---|---|
| Xanthan gum | 0.1 |
| 1,3-butanediol | 0.075 |
| Caprylyl hydroxamic acid | 0.05 |
| 1,2-hexanediol | 0.025 |
| P-hydroxyacetophenone | 0.015 |
| Glucose | 0.01 |
| Disodium EDTA | 0.01 |
| Caprylyl Glycol | 0.01 |
| Ethylhexylglycerol | 0.003 |
| Deionized water | 98.927 |

Example 14 Effect of β-Glucan on Steroid-Dependent Dermatitis

Several cases of steroid-dependent dermatitis patients tried β-glucan, which also achieved unexpected results.
1) A 47-year-old female patient G used hormone-containing cosmetics for a long time, causing steroid-dependent dermatitis, facial swelling and ulceration, accompanied by infection. After 1 year of treatment in the dermatology department of a 3A Grade hospital, and using the cosmetics recommended by the hospital to repair the barrier, the infection condition was controlled, but the facial swelling and ulceration was not effectively treated. Using the skin care essence prepared by formula 1 of Example 12 for 1 month, the swelling and ulceration were controlled, and only the scars caused by long-term skin lesions remained.

Figure 9:
FIG. 9 shows the comparison of the effect of patient H before and after the trial of administrating *Schizophyllum* β-glucan product in Example 14.

2) A 48-year-old female patient H used hormone-containing cosmetics for a long time, causing steroid-dependent dermatitis, facial skin swelling, itching, and can not use any other skin care products. The 5 mg/mL *Schizophyllum* β-glucan prepared by the method of Example 1 was used for cleansing and skin care (5 mg/mL *Schizophyllum* β-glucan, diluted 20 times with water, was used for skin cleaning; 5 mg/mL *Schizophyllum* β-glucan, diluted 5 times with water for daily skin care). After the trial for 11 days, the swelling of the face disappeared, no symptoms of itching, and the skin color returned to normal (FIG. 9)

Figure 10:
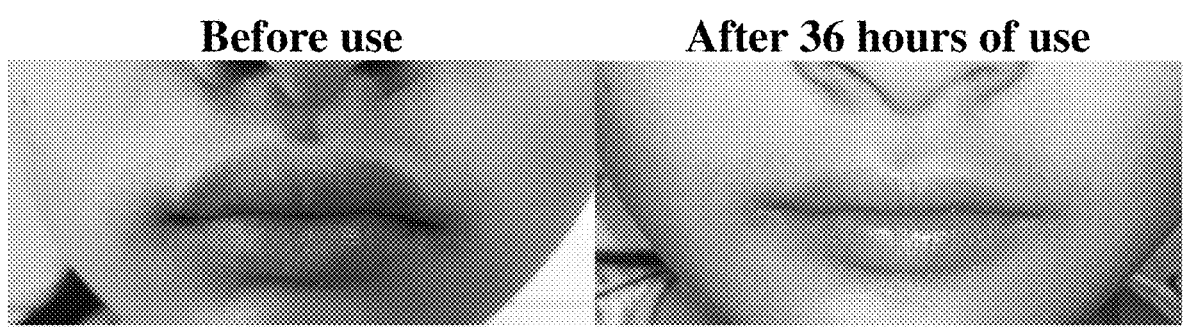
FIG. 10 shows the comparison of the effect of patient I before and after the trial of administrating *Schizophyllum* β-glucan product in Example 14.

3) A 10-year-old girl patient I relied heavily on lip balm. After using lip balm several times a day (6-8 times) for 6 months, because the parents did not buy it in time, she felt that the lips were burning and painful. The above symptoms subsided after using the lip balm again. Then, the parents let her stop using it. One day later, it was found that the lips were red and swollen, there were pimples on the upper and lower lips, and there was a purulent papule on the left lower lip. (FIG. 10 left). The 5 mg/mL sterile *Schizophyllum* β-glucan (without preservative) prepared according to Example 1 was applied directly to the lip. To prevent *Schizophyllum* β-glucan from infecting organisms, one bottle (25 mL) was used per day. After 36 h of use, the redness and swelling of the lips disappeared, and the pimples on the lips and corners of the mouth disappeared (FIG. 10 right). After half a month, due to the feeling of dry lips and unawareness of the seriousness of the problem, the lip balm was used once again for 2 days. After stopping at the request of parents, the lips became red, swollen and chapped again. After using 5 mg/mL sterile *Schizophyllum* β-glucan and sheep oil for 2 days, lip molting occurred. After that, the sheep oil was stopped, and only 5 mg/mL sterile *Schizophyllum* β-glucan was externally applied several times a day. The redness and swelling subsided after 2 days. After consolidation with *Schizophyllum* glucan for 1 month, there was no recurrence.

DISCUSSION

The present invention discovered for the first time that β-glucan had significant effects on treatment and prevention of acne, especially the high-viscosity, high-molecular-weight *Schizophyllum* β-glucan prepared in Example 1 of the present invention.

The present invention discovered for the first time that β-glucan had significant effects on treatment and prevention of steroid-dependent dermatitis, especially the high-viscosity, high-molecular-weight *Schizophyllum* β-glucan prepared in Example 1 of the present invention.

The present invention found that the activity of β-glucan to treat and prevent acne and/or steroid-dependent dermatitis was related to the degree of branching, the amount of glucose in the side chain, the three-dimensional structure, and the molecular weight. The non-branched biopolysaccharide has no activity in treating and preventing acne and/or steroid-dependent dermatitis, or the effect is poor.

The degree of branching of yeast glucan is variable, and the side chain composed of β-1,6-glycosidic bonds is randomly extended from the main chain. The amount of glucose in the side chain is large and variable, and the number can be as high as hundreds. Granular yeast glucan has long side chains and is easy to form a tight network structure, while soluble yeast β-glucan has undergone structural modification, and its original activity has been greatly affected. The effect of treatment and prevention of steroid-dependent dermatitis is not as good as that of *Schizophyllum* β-glucan.

*Schizophyllum* β-glucan is moderately branched, with only one glucose residue on the side chain, and high molecular weight, with a larger and longer three-dimensional triple helix structure, which has a good activity in treatment and prevention of acne and/or steroid-dependent dermatitis.

All literatures mentioned in the present application are incorporated by reference herein, as though individually incorporated by reference. In addition, it should be understood that after reading the above teaching content of the present invention, various changes or modifications may be made by those skilled in the art, and these equivalents also fall within the scope as defined by the appended claims of the present application.

The invention claimed is:

1. A method of accelerating the regression or healing of acne in a subject in need thereof, comprising the step of administering *Schizophyllum* β-glucan and yeast β-glucan, wherein the accelerating the regression or healing of acne excludes treating scars and the *Schizophyllum* β-glucan has a structure shown in formula I,

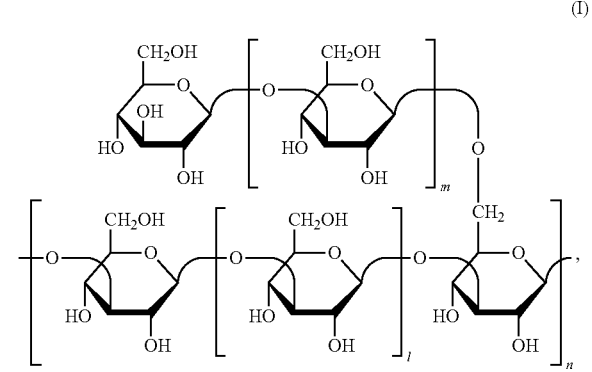

(I)

wherein, l is 1; m is 0; n is an integer of 100-10000; and the molecular weight of the β-glucan is 3000-6000 kD.

2. The method according to claim 1, wherein the branch degree of the *Schizophyllum* β-glucan is 0.2-0.4.

3. The method according to claim 1, wherein the yeast β-glucan is soluble yeast β-glucan.

4. The method according to claim 3, wherein the mass concentration of the *Schizophyllum* β-glucan is 1 μg/mL-1 mg/ml.

5. The method according to claim 3, wherein the mass concentration of the soluble yeast β-glucan is 1 μg/mL-1 mg/ml.

6. The method according to claim 3, wherein the mass concentration of the *Schizophyllum* β-glucan is 0.5 mg/mL, and the concentration of the soluble yeast β-glucan is 0.5 mg/mL.

7. The method according to claim 1, wherein the acne is selected from the group consisting of white head acne, black head acne, papular acne, pustular acne, cystic acne, nodular acne, and a combination thereof.

* * * * *